United States Patent
Kurashima

(10) Patent No.: US 9,298,321 B2
(45) Date of Patent: Mar. 29, 2016

(54) ELECTROSTATIC CAPACITANCE-TYPE INPUT DEVICE AND INPUT DEVICE-ATTACHED ELECTRO-OPTICAL APPARATUS

(75) Inventor: Takeshi Kurashima, Nagano (JP)

(73) Assignee: Japan Display Inc., Tokyo (JP)

( * ) Notice: Subject to any disclaimer, the term of this patent is extended or adjusted under 35 U.S.C. 154(b) by 930 days.

(21) Appl. No.: 12/898,344

(22) Filed: Oct. 5, 2010

(65) Prior Publication Data

US 2011/0090159 A1 Apr. 21, 2011

(30) Foreign Application Priority Data

Oct. 21, 2009 (JP) ................. P2009-242158

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC .......... G06F 3/044; G06F 2203/04111; G06F 2203/04107; G06F 3/0412; H03K 2217/960765
USPC ...................... 345/156–178; 178/18.01–20.04
See application file for complete search history.

(56) References Cited

U.S. PATENT DOCUMENTS

| | | | | | |
|---|---|---|---|---|---|
| 5,457,289 | A | * | 10/1995 | Huang et al. ................ | 178/18.08 |
| 5,650,597 | A | * | 7/1997 | Redmayne ................... | 178/18.06 |
| 5,940,064 | A | * | 8/1999 | Kai ........................ | G06F 3/0412 345/173 |
| 6,016,502 | A | * | 1/2000 | Haneda .................. | G06F 3/0481 345/87 |
| 6,239,788 | B1 | * | 5/2001 | Nohno ................... | G06F 3/0412 178/18.03 |
| 6,400,359 | B1 | * | 6/2002 | Katabami ............... | G06F 3/044 345/173 |
| 6,415,240 | B1 | * | 7/2002 | Kobayashi ............ | G06F 3/0433 178/18.04 |
| 7,030,860 | B1 | | 4/2006 | Hsu et al. | |
| 2003/0052867 | A1 | * | 3/2003 | Shigetaka et al. ............. | 345/173 |
| 2005/0270273 | A1 | * | 12/2005 | Marten ......................... | 345/173 |
| 2006/0022682 | A1 | * | 2/2006 | Nakamura et al. ............. | 324/681 |
| 2007/0229466 | A1 | * | 10/2007 | Peng et al. ..................... | 345/173 |
| 2007/0242054 | A1 | * | 10/2007 | Chang et al. .................. | 345/173 |

(Continued)

FOREIGN PATENT DOCUMENTS

| | | |
|---|---|---|
| JP | 2003-511799 | 3/2003 |
| JP | 2009-169720 | 7/2009 |

(Continued)

*Primary Examiner* — Thuy Pardo
(74) *Attorney, Agent, or Firm* — K&L Gates LLP

(57) ABSTRACT

An electrostatic capacitance-type input device in which input position detecting electrodes are disposed in an input area of a substrate, includes a lower layer-side conductive film, an interlayer insulating film, and an upper layer-side conductive film, which are stacked on the substrate in order from the substrate side. A first input position detecting electrode and a second input position detecting electrode that extends in a direction intersecting the first input position detecting electrode and includes a discontinued portion in an intersection portion of the first and second input position detecting electrodes are formed as the input position detecting electrodes by a first conductive film out of the lower and upper layer-side conductive films, and a relay electrode that overlaps with the first input position detecting electrode in the intersection portion so as to be electrically connected to the discontinued portion of the second input position detecting electrode and an input area shield electrode that overlaps with the first and second input position detecting electrodes are formed by a second conductive film out of the lower and upper layer-side conductive films.

8 Claims, 11 Drawing Sheets

(56) References Cited

U.S. PATENT DOCUMENTS

| | | | |
|---|---|---|---|
| 2007/0261258 A1* | 11/2007 | Ahn et al. | 33/366.19 |
| 2009/0167720 A1* | 7/2009 | Geaghan | 345/174 |
| 2009/0236151 A1 | 9/2009 | Yeh et al. | |
| 2010/0026661 A1* | 2/2010 | Teramoto | 345/174 |
| 2010/1082275 | 7/2010 | Saitou | |

FOREIGN PATENT DOCUMENTS

| | | |
|---|---|---|
| JP | 2009-230735 | 10/2009 |
| JP | 2010-170163 | 8/2010 |

* cited by examiner

ELECTROSTATIC CAPACITANCE-TYPE INPUT DEVICE AND INPUT DEVICE-ATTACHED ELECTRO-OPTICAL APPARATUS

CROSS REFERENCES TO RELATED APPLICATIONS

The present application claims priority to Japanese Patent Application No. JP 2009-242158 filed on Oct. 21, 2009, the entire contents of which is hereby incorporated by reference.

BACKGROUND

The present disclosure relates to an electrostatic capacitance-type input device that detects an input position based on a change in electrostatic capacitance coupled with an input position detecting electrode and an input device-attached electro-optical apparatus that includes the electrostatic capacitance-type input device.

Among electronic apparatuses such as cellular phones, car navigation systems, personal computers, ticket-vending machines, and banking terminals, there are apparatuses, in which an input device termed a touch panel is arranged on the surface of a liquid crystal device or the like, allowing a user to input information while referring to an image displayed in an image display area of the liquid crystal device. Among such input devices, electrostatic capacitance-type input devices monitor electrostatic capacitance that is coupled with each of a plurality of input position detecting electrodes. Thus, when a finger is in proximity to any of the plurality of input position detecting electrodes, the electrostatic capacitance of the input position detecting electrode to which the finger is in proximity increases by the amount corresponding to electrostatic capacitance generated between the finger and the input position detecting electrode. Accordingly, the electrode to which the finger is in proximity can be specified.

Such electrostatic capacitance-type input devices detect a change in the capacitance coupled with the input position detecting electrode, and accordingly, can be easily influenced by electromagnetic wave noise. Thus, electrostatic capacitance-type input devices in which a transparent substrate for electric shielding or a conductive film for electric shielding is formed on a side opposite to the input operation side is disposed are proposed (see JP-T-2003-511799).

SUMMARY

However, in the shielding structure disclosed in JP-T-2003-511799, since a substrate is added to the electrostatic capacitance-type input device for blocking electromagnetic noise that may penetrate from the input operation side, the number of components is increased. Therefore there is a problem in that the cost is increased, and the thickness of the electrostatic capacitance-type input device is increased.

Thus, it is desirable to provide an electrostatic capacitance-type input device that is not easily influenced by electromagnetic wave noise, which may be penetrated from a side opposite to the input operation side, without adding a substrate used for electric shielding and an input-device-attached electro-optical apparatus including the electrostatic capacitance-type input device.

According to an embodiment, there is provided an electrostatic capacitance-type input device in which a plurality of input position detecting electrodes are disposed in an input area of a substrate. The electrostatic capacitance-type input device includes: a lower layer-side conductive film; an interlayer insulating film; and an upper layer-side conductive film, which are stacked on the substrate in order from the substrate side. A first input position detecting electrode that extends in a first direction of an in-plane direction of the substrate and a second input position detecting electrode that extends in a second direction intersecting the first direction of the in-plane direction of the substrate and includes a discontinued portion in an intersection portion of the first input position detecting electrode and the second input position detecting electrode are formed as the input position detecting electrodes by a first conductive film, which is positioned in an input operation side, out of the lower layer-side conductive film and the upper layer-side conductive film, and a relay electrode that overlaps with the first input position detecting electrode through the interlayer insulating film in the intersection portion so as to be electrically connected to the discontinued portion of the second input position detecting electrode and an input area shield electrode that is separated from the relay electrode and overlaps with the first input position detecting electrode and the second input position detecting electrode through the interlayer insulating film in a plan view are formed by a second conductive film, which is positioned on a side opposite to the input operation side, out of the lower layer-side conductive film and the upper layer-side conductive film.

According to the above-described electrostatic capacitance-type input device, out of the lower layer-side conductive film and the upper layer-side conductive film that are stacked in the substrate, the input position detecting electrodes (the first input position detecting electrode and the second input position detecting electrode) are formed by the first conductive film positioned on the input operation side, and the input area shield electrode that overlaps with the input position detecting electrodes (the first input position detecting electrode and the second input position detecting electrode) in a plan view are formed by the second conductive film that is positioned on a side opposite to the input operation side. Accordingly, the electrostatic capacitance-type input device is not easily influenced by electromagnetic wave noise that may penetrate the input area from the side opposite to the input operation side. In addition, the input area shield electrode, similarly to a relay electrode that is electrically connected to the second input position detecting electrode that is discontinued in the intersection portion of the first input position detecting electrode and the second input position detecting electrode, is formed by the second conductive film. Accordingly, the electrostatic capacitance-type input device is configured not to be easily influenced by electromagnetic noise, which may penetrate into the input area from the side opposite to the input operation side, without adding a substrate used for electromagnetic shielding.

In the above-described electrostatic capacitance-type input device, it is preferable that, in an area of the substrate that is positioned on an outer side of the input area, a wiring that is electrically connected to the input position detecting electrode by one conductive film of the first conductive film and the second conductive film is formed, and an outer periphery-side shield electrode that overlaps with the wiring through the interlayer insulating film in a plane view is formed by the other conductive film of the first conductive film and the second conductive film. In such a case, the electrostatic capacitance-type input device can be configured not to be easily influenced by electromagnetic wave noise that may penetrate the wiring.

In the above-described electrostatic capacitance-type input device, a configuration in which the wiring is formed by the first conductive film, and the outer periphery-side shield electrode is formed by the second conductive film may be employed. In such a case, the electrostatic capacitance-type input device can be configured not to be easily influenced by electromagnetic wave noise that may penetrate into the wiring from the side opposite to the input operation side.

In such a case, it is preferable that the outer periphery-side shield electrode is formed integrally with the input area shield electrode by the second conductive film. In such a case, a shield electrode that is continuous over the entire area extending over the input area and the outer periphery-side area can be disposed. Accordingly, the electrostatic capacitance-type input device can be configured not to be easily influenced by electromagnetic wave noise that may penetrate into the input area or the wiring from the side opposite to the input operation side.

In the above-described electrostatic capacitance-type input device, a configuration in which the wiring is formed by the second conductive film, and the outer periphery-side shield electrode is formed by the first conductive film may be employed. In such a case, the electrostatic capacitance-type input device can be configured not to be easily influenced by electromagnetic wave noise that may penetrate into the wiring from the input operation side.

In the above-described electrostatic capacitance-type input device, it is preferable that, on an outer periphery side of the wiring on the substrate, a shielding auxiliary electrode is formed by the conductive film, which is disposed on the side forming the wiring, out of the first conductive film and the second conductive film, and the shielding auxiliary electrode and the shield electrode overlap with each other so as to be electrically connected to each other in an area in which the interlayer insulating film disposed on the outer periphery side of the wiring is not formed. In such a case, the electrostatic capacitance-type input device can be configured not to be easily influenced by electromagnetic wave noise that may penetrate into the wiring from the outer periphery side of the wiring.

In the above-described electrostatic capacitance-type input device, there are cases where the lower layer-side conductive film, the interlayer insulating film, and the upper-layer side conductive film are formed on a substrate face that is positioned on the input operation side of the substrate. In such a case, the upper layer-side conductive film is the first conductive film, and the lower layer-side conductive film is the second conductive film.

In the above-described electrostatic capacitance-type input device, a configuration in which the lower layer-side conductive film, the interlayer insulating film, and the upper-layer side conductive film are formed on a substrate face that is positioned on a side opposite to the input operation side of the substrate may be employed. In such a case, the lower layer-side conductive film is the first conductive film, and the upper layer-side conductive film is the second conductive film.

The electrostatic capacitance-type input device according to the embodiment can be used, for example, for configuring an input device-attached electro-optical apparatus. In such an input device-attached electro-optical apparatus, an electro-optical panel for generating an image is configured on a side of the substrate that is opposite to the input operation side.

The input device-attached electro-optical apparatus according to the embodiment of the present invention can be used in an electronic apparatus such as a cellular phone, a car navigation system, a personal computer, a ticket-vending machine, or a banking terminal.

Additional features and advantages are described herein, and will be apparent from the following Detailed Description and the figures.

DETAILED DESCRIPTION

Figure 1A:
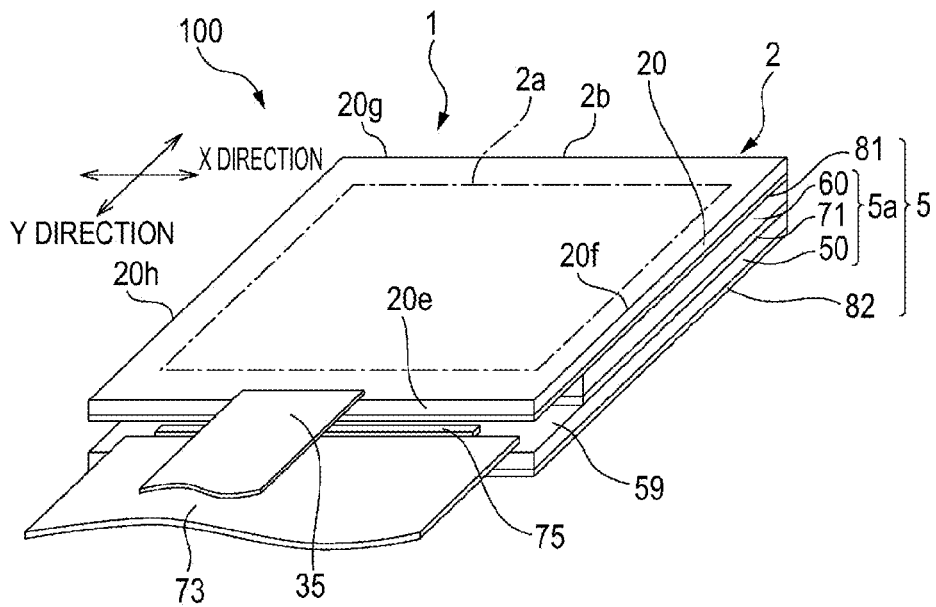
FIGS. 1A to 1C are schematic diagrams illustrating an electrostatic capacitance-type input device according to an embodiment.

Embodiments will be described with reference to the accompanying drawings. In the drawings referred to in the description presented below, in order to allow each layer or each member to have a size to be recognizable in the drawings, the scales of the layers or the members are differently set. Hereinafter, after a basic configuration that is common to the embodiments is described, detailed description of each embodiment will be described.

[Basic Configuration]

(Entire Configuration of Input Device-Attached Electro-Optical Apparatus)

Figure 1B:
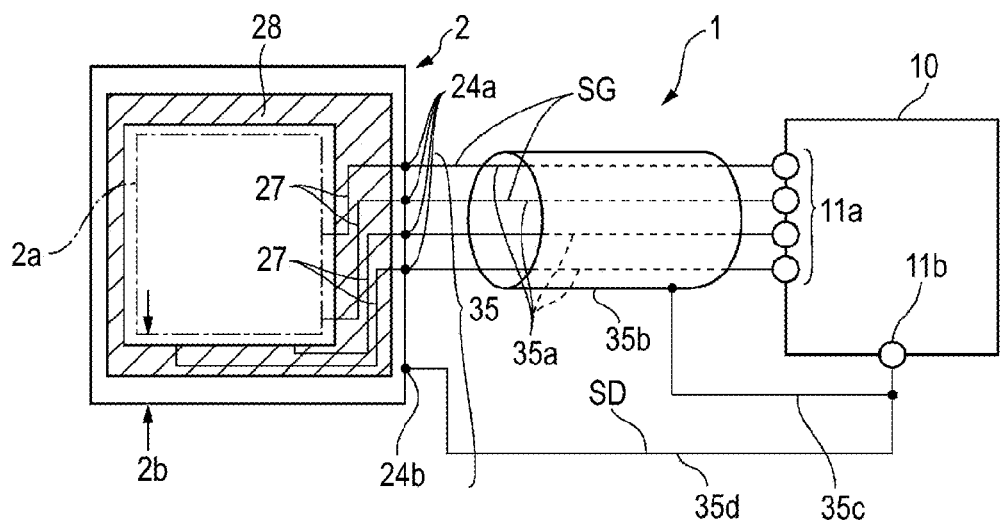
Figure 1C:
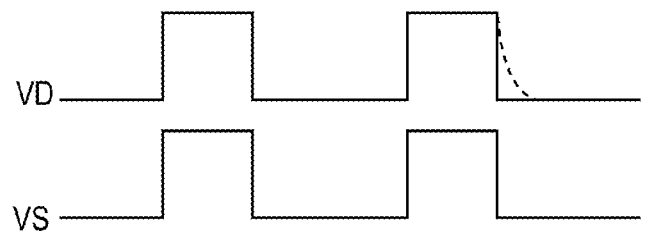
Figure 2A:
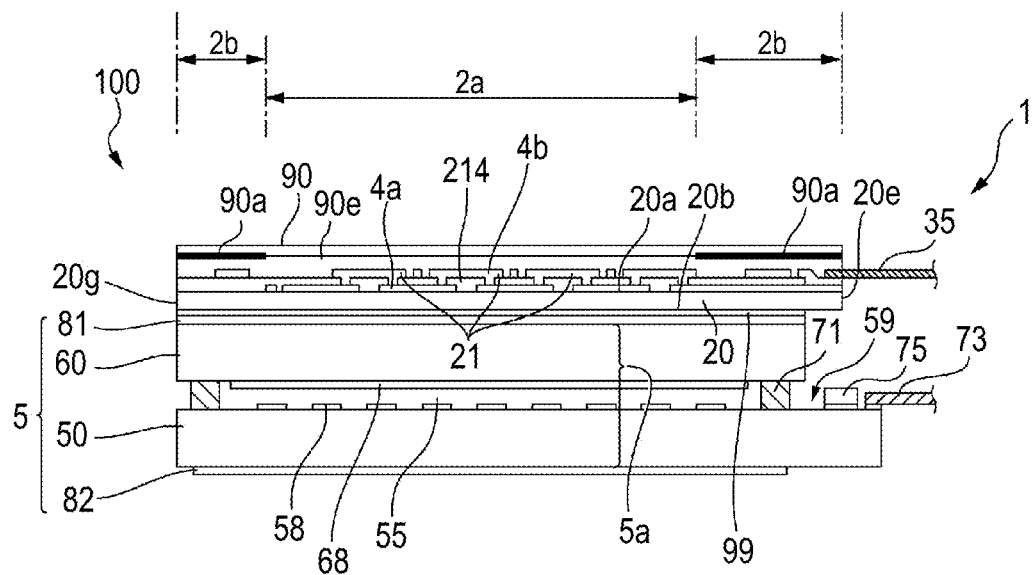
FIGS. 2A and 2B are schematic diagrams illustrating the cross-sectional configurations of input device-attached electro-optical apparatuses according to embodiments.
Figure 2B:
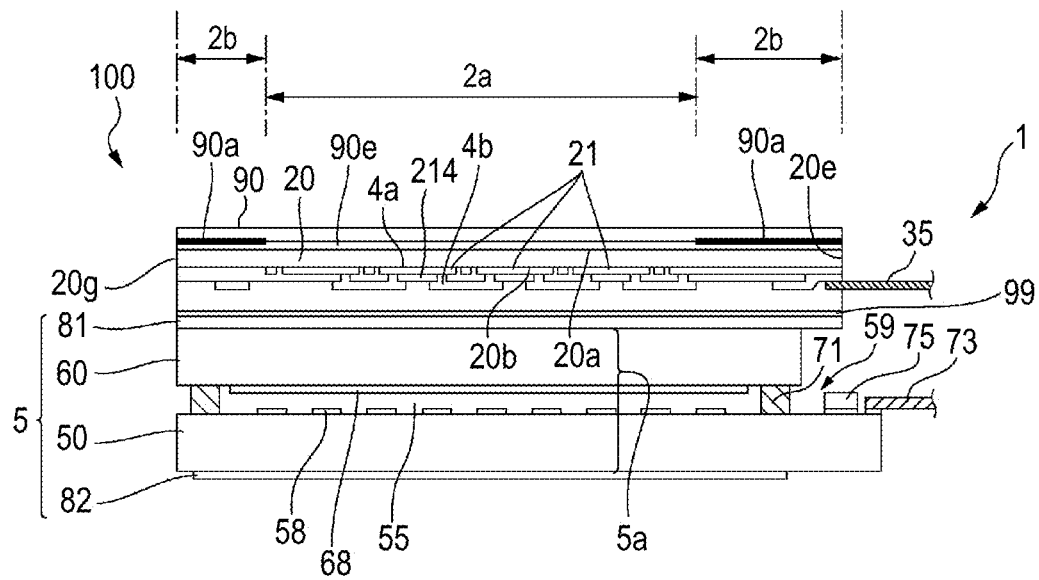

FIGS. 1A to 1C are schematic diagrams illustrating an electrostatic capacitance-type input device according to an embodiment. FIG. 1A is a schematic diagram illustrating the entire configuration of an input device-attached electro-optical apparatus including the electrostatic capacitance-type input device of this embodiment. FIG. 1B is a schematic diagram illustrating the electric configuration of the electrostatic capacitance-type input device. FIG. 1C is a schematic diagram illustrating an electric potential that is supplied to the electrostatic capacitance-type input device. FIGS. 2A and 2B are schematic diagrams illustrating the cross-sectional con-figurations of input device-attached electro-optical apparatuses according to embodiments of the present invention. FIG. 2A is a schematic diagram illustrating a configuration example in which an input position detecting electrode is disposed on a first face side of the substrate that is positioned on an input operation side. FIG. 2B is a schematic diagram illustrating a configuration example in which the input position detecting electrode is disposed on a second face side of the substrate that is opposite to the input operation side.

As represented in FIG. 1A, generally, the input device-attached electro-optical apparatus 100 of this embodiment has an image generating device 5 that is configured by a liquid crystal device or the like and an electrostatic capacitance-type input device 1 that is disposed on a face of the image generating device 5, which emits display light, in an overlapping manner. The electrostatic capacitance-type input device 1 includes an input panel 2 (touch panel), and the image generating device 5 includes a liquid crystal panel serving as an electro-optical panel 5a (display panel). In this embodiment, both the input panel 2 and the electro-optical panel 5a have a planar shape of a rectangle, and the center area of the electrostatic capacitance-type input device 1 and the input device-attached electro-optical apparatus 100 in the plan view is an input area 2a. In addition, an area in which the image generating device 5 and the input area 2a of the input device-attached electro-optical apparatus 100 overlap with each other in the plan view is an image forming area. A flexible wiring substrate 35 is connected to a side of the input panel 2 on which an end portion 20e is positioned, and a flexible wiring substrate 73 is connected to a side of the electro-optical panel 5a on which the end portion 20e is positioned.

As represented in FIG. 1B, in the electrostatic capacitance-type input device 1, a control IC 10 used for performing an input operation on the input panel 2 is electrically connected to the input panel 2 through the flexible wiring substrate 35. Thus, an electric potential to be described later with reference to FIG. 1C is input to the input panel 2 from the IC 10.

In FIGS. 1A, 2A, and 2B, the image generating device 5 is an active matrix-type liquid crystal display device of transmission type or semi-transmission reflection type. On a side (a side opposite to the display light output side) of the electro-optical panel 5a that is opposite to a side on which the input panel 2 is disposed, a back light device (not shown in the figure) is disposed. The back light device, for example, has a light guiding plate, which has translucency, disposed on a side of the electro-optical panel 5a that is opposite to the side on which the electrostatic capacitance-type input device 1 is disposed in an overlapping manner and a light source such as a light emitting diode that emits white light or the like toward a side end portion of the light guiding plate. After light emitted from the light source is incident to the side end portion of the light guiding plate, the light is output toward the electro-optical panel 5a while propagating inside the light guiding plate. Between the light guiding plate and the electro-optical panel 5a, a sheet-shaped optical member such as a light scattering sheet or a prism sheet may be disposed.

In the image generating device 5, on the display light output side of the electro-optical panel 5a, a first polarizing plate 81 is disposed in an overlapping manner. In addition, on the opposite side of the electro-optical panel 5a, a second polarizing plate 82 is disposed in an overlapping manner. Thus, the electrostatic capacitance-type input device 1 is bonded to the first polarizing plate 81 by a translucent adhesive agent 99 such as an acrylic resin system. The electro-optical panel 5a includes a translucent component substrate 50 that is disposed on a side opposite to the display light output side and a translucent opposing substrate 60 that is disposed on the display light output side so as to face the component substrate 50. The opposing substrate 60 and the component substrate 50 are bonded together by a rectangular frame-shaped sealing member 71, and a liquid crystal layer 55 is maintained within an area between the opposing substrate 60 and the component substrate 50 that is surrounded by the sealing member 71. On a face of the component substrate 50 that faces the opposing substrate 60, a plurality of pixel electrodes 58 are formed by a translucent conductive film such as an ITO (Indium Tin Oxide) film. In addition, on a face of the opposing substrate 60 that faces the component substrate 50, a common electrode 68 is formed by a translucent conductive film such as an ITO film. In addition, a color filter is formed on the opposing substrate 60. When the image generating device 5 is the IPS (In Plane Switching) type or the FFS (Fringe Field Switching) type, the common electrode 68 is disposed on the component substrate 50 side. The component substrate 50 may be disposed on the display light output side of the opposing substrate 60. A driving IC 75 is built in an overhang area 59 of the component substrate 50 that overhangs from the edge of the opposing substrate 60 by using a COG technique, and the flexible wiring substrate 73 is bonded to the overhang area 59. On the component substrate 50, a driving circuit may be formed simultaneously with a switching device disposed on the component substrate 50.

(Detailed Configuration of Electrostatic Capacitance-Type Input Device 1)

In the electrostatic capacitance-type input device 1 shown in FIGS. 2A and 2B, the input panel 2 includes a translucent substrate 20 that is configured by a glass plate, a plastic plate, or the like. In this embodiment, a glass substrate is used as the substrate 20. In a case where the substrate 20 is formed from a plastic material, as the plastic material, a translucent sheet having heat resistance such as PET (polyethylene terephthalate), PC (polycarbonate), PES (polyether sulfone), PI (polyimide), or cyclic olefin resin including polynorbornene may be used. Hereinafter, a substrate face positioned on the input operation side of the substrate 20 will be described as a first face 20a, and a substrate face positioned on a side opposite to the input operation side will be described as a second face 20b.

Of the electrostatic capacitance-type input devices 1 shown in FIGS. 2A and 2B, in the configuration example represented in FIG. 2A, on the first face 20a of the substrate 20, a lower layer-side conductive film 4a, an interlayer insulating film 214, and an upper layer-side conductive film 4b are formed from the lower layer side toward the upper layer side viewed from the substrate 20, and an input position detecting electrode 21 is formed by the upper layer-side conductive film 4b out of the lower layer-side conductive film 4a and the upper layer-side conductive film 4b, which will be described later in detail. In addition, a relay electrode or an input area shield electrode is formed by the lower layer-side conductive film 4a. In the end portion 20e of the substrate 20, the flexible wiring substrate 35 is connected to the first face 20a. To the first face 20a side of the substrate 20, an insulating cover 90 having translucency is attached by using an adhesive agent 90e or the like. In an area of the cover 90 that overlaps with an outer area 2b of the first face 20a of the substrate 20, a light shielding layer 90a having an insulating property is printed. An area that is surrounded by the light shielding layer 90a is an input area 2a. The light shielding layer 90a overlaps with the outer area of the electro-optical panel 5a and shields light leaking from the light source of the image forming device 5 or the end portion of the light guiding plate thereof.

In the configuration example represented in FIG. 2B, on the second face 20b of the substrate 20, a lower layer-side conductive film 4a, an interlayer insulating film 214, and an upper layer-side conductive film 4b are formed from the lower layer side toward the upper layer side viewed from the substrate 20. The input position detecting electrode 21 is formed by the lower layer-side conductive film 4a out of the lower layer-side conductive film 4a and the upper layer-side conductive film 4b. In addition, a relay electrode or an input area shield electrode is formed by the upper layer-side conductive film 4b. In such a configuration, in the end portion 20e of the substrate 20, the flexible wiring substrate 35 is connected to the second face 20b. Also in this embodiment, to the first face 20a side of the substrate 20, an insulating cover 90 having translucency is attached by using an adhesive agent 90e or the like. In an area of the cover 90 that overlaps with the outer area 2b of the first face 20a of the substrate 20, a light shielding layer 90a having an insulating property is printed.

Hereinafter, examples of a form (the form represented in FIG. 2A) in which the lower-side conductive film 4a, the interlayer insulating film 214, and the upper layer-side conductive film 4b are formed on the first face 20a positioned on the input operation side of the substrate 20 according to embodiments of the present invention will be described as Embodiments 1 and 2. In such a case, of the lower layer-side conductive film 4a and the upper layer-side conductive film 4b, the upper layer-side conductive film 4b corresponds to the first conductive film that is positioned on the input operation side, and the lower layer-side conductive film 4a corresponds to the second conductive film that is positioned on a side opposite to the input operation side.

In addition, examples of a form (the form represented in FIG. 2B), in which the lower-side conductive film 4a, the interlayer insulating film 214, and the upper layer-side conductive film 4b are formed on the second face 20b positioned on a side opposite to the input operation side of the substrate 20, according to embodiments will be described as Embodiments 3 and 4. In such a case, of the lower layer-side conductive film 4a and the upper layer-side conductive film 4b, the lower layer-side conductive film 4a corresponds to the first conductive film that is positioned on the input operation side, and the upper layer-side conductive film 4b corresponds to the second conductive film that is positioned on a side opposite to the input operation side.

Embodiment 1

Hereinafter, the electrostatic capacitance-type input device 1 of a type that is described with reference to FIG. 2A will be described with reference to FIGS. 3A to 5C.

Figure 3A:
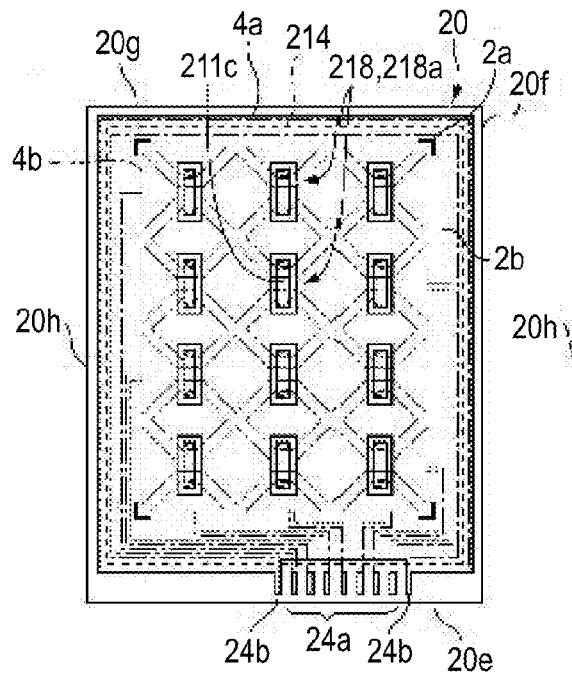
FIGS. 3A to 3D are schematic diagrams illustrating the planar configurations of an electrostatic capacitance-type input device according to Embodiment 1.
Figure 3B:
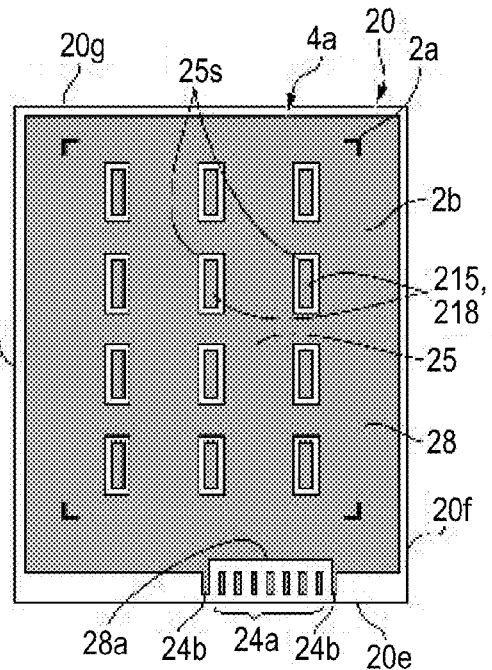
Figure 3C:
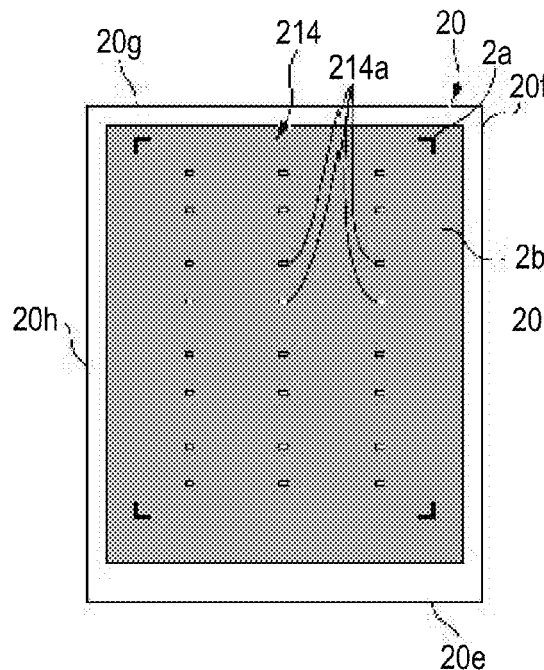
Figure 3D:
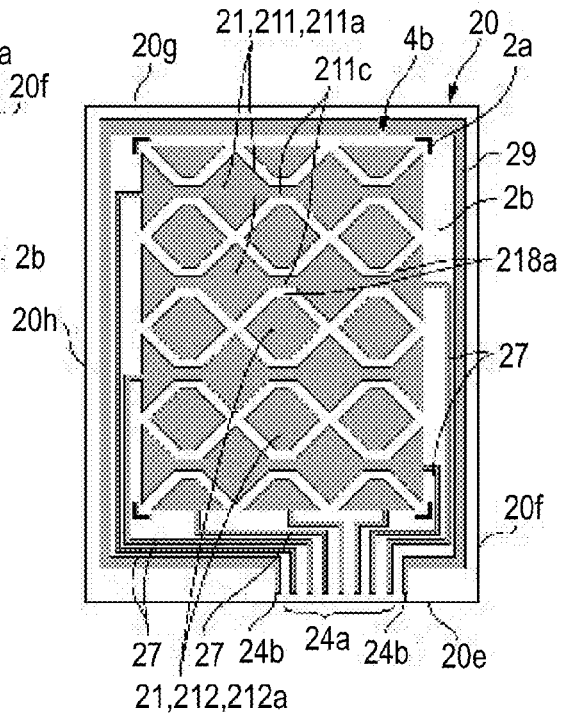
Figure 4:
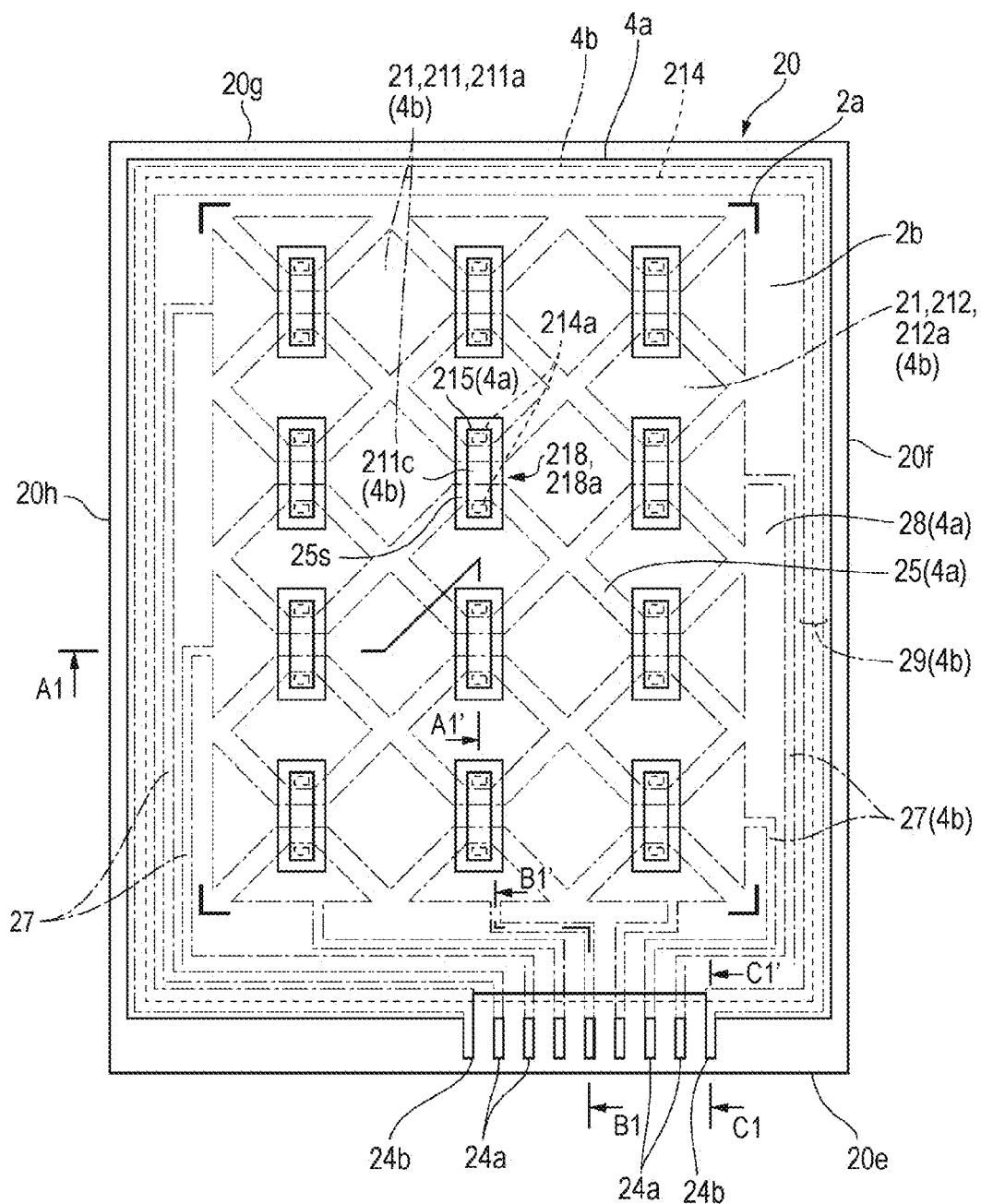
FIG. 4 is an enlarged schematic diagram illustrating the planar configuration of electrodes and the like that are formed on a substrate of an electrostatic capacitance-type input device according to Embodiment 1.

FIGS. 3A to 3D are schematic diagrams illustrating the planar configurations of the electrostatic capacitance-type input device 1 according to Embodiment 1. FIG. 3A is a schematic diagram illustrating the planar positional relationship of electrodes and the like that are formed on the substrate 20 of the electrostatic capacitance-type input device 1. FIG. 3B is a schematic diagram illustrating the planar configuration of the upper layer-side conductive film 4b that is formed on the substrate 20. FIG. 3C is a schematic diagram illustrating the planar configuration of the interlayer insulating film 214 that is formed on the substrate 20. FIG. 3D is a schematic diagram illustrating the planar configuration of the upper layer-side conductive film 4b that is formed on the substrate 20. In FIG. 3A, elements that are shown in FIGS. 3B, 3C, and 3D are represented in an overlapping manner. FIG. 4 is an enlarged schematic diagram illustrating the planar configuration of electrodes and the like that are formed on the substrate 20 of the electrostatic capacitance-type input device 1 according to Embodiment 1.

In FIGS. 3B, 3C, and 3D, an area in which the lower layer-side conductive film 4a, the interlayer insulating film 214, and the upper layer-side conductive film 4b are formed is represented as a gray area. In addition, in FIGS. 3A and 4, the lower layer-side conductive film 4a is denoted by a solid line, the interlayer insulating film 214 is denoted by a dotted line, and the upper layer-side conductive film 4b is denoted by a dashed dotted line. In addition, in FIGS. 3A, 3B, 3C, 3D, and 4, each portion of the input area 2a is denoted by a mark having a letter "L" shape. The same applies to drawings referred to in Embodiment 2 to be described later.

Figure 5A:
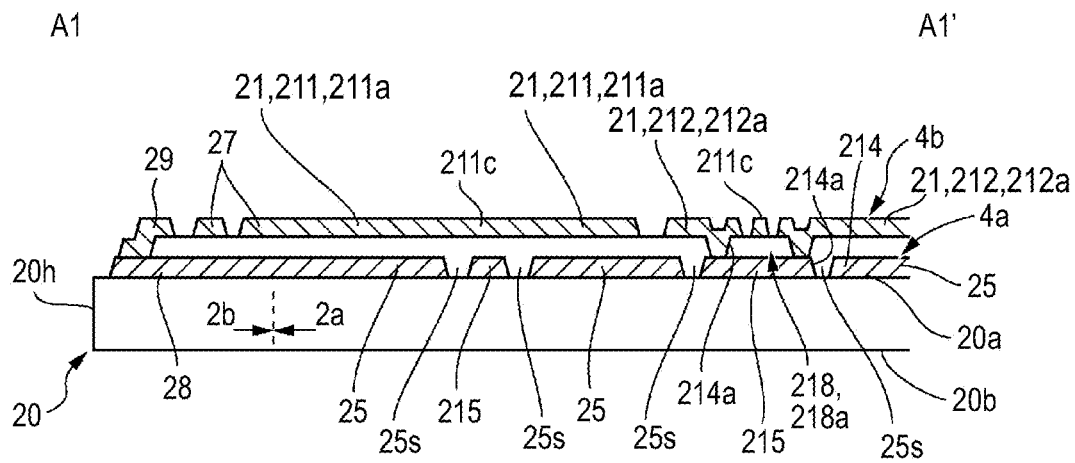
FIGS. 5A, 5B, and 5C are schematic diagrams illustrating the cross-sectional configurations of the substrate of the electrostatic capacitance-type input device according to Embodiment 1.
Figure 5B:
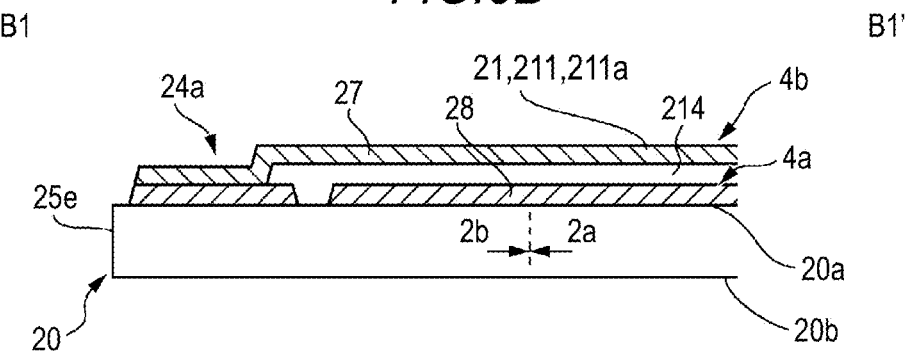
Figure 5C:
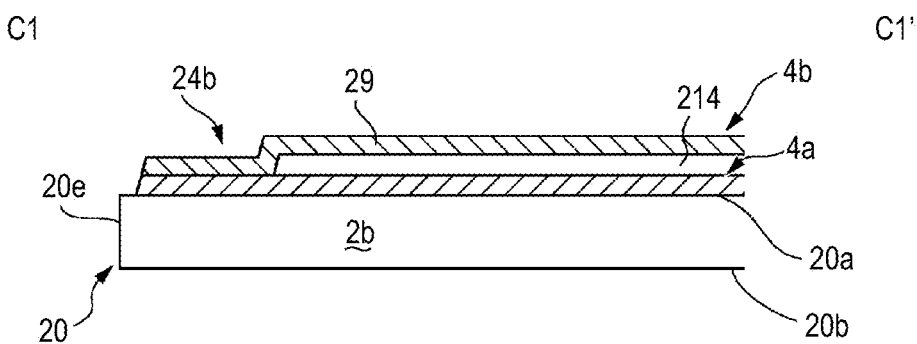

FIGS. 5A, 5B, and 5C are schematic diagrams illustrating the cross-sectional configurations of the substrate 20 of the electrostatic capacitance-type input device 1 according to Embodiment 1. FIGS. 5A, 5B, and 5C are cross-sectional views of the substrate 20 taken along lines A1-A1', B1-B1', and C1-C1' shown in FIG. 4.

The electrostatic capacitance-type input device 1 described below is an example of the form (the form represented in FIG. 2A), in which the lower layer-side conductive film 4a, the interlayer insulating film 214, and the upper layer-side conductive film 4b are formed on the first face 20a that is positioned on the input operation side, according to an embodiment. Here, the upper layer-side conductive film 4b corresponds to the first conductive film that is positioned on the input operation side, and the lower layer-side conductive film 4a corresponds to the second conductive film that is positioned on the side opposite to the input operation side.

As shown in FIGS. 3A to 3D, FIG. 4, and FIGS. 5A to 5C, according to the electrostatic capacitance-type input device 1 of this embodiment, on the first face 20a side of the substrate 20, the lower layer-side conductive film 4a, the interlayer insulating film 214, and the upper layer-side conductive film 4b are sequentially formed from the lower layer side toward the upper layer side viewed from the substrate 20. In this embodiment, each of the lower layer-side conductive film 4a and the upper layer-side conductive film 4b is formed of a translucent conductive film having a film thickness of 10 nm to 40 nm such as an ITO film or an IZO (Indium Zinc Oxide) film, and the interlayer insulating film 214 is formed of a translucent insulating film having a film thickness of 40 nm to 60 mm such as a silicon oxide film. On the entirety of the first face 20a of the substrate 20, a translucent underlying protection film that is formed of a silicon oxide film or the like may be formed. In such a case, the lower layer-side conductive film 4a, the interlayer insulating film 214, and the upper layer-side conductive film 4b are sequentially stacked on the underlying protection film. In order to configure such an electrostatic capacitance-type input device 1, first, after the lower layer-side conductive film 4a is formed in a pattern shown in FIG. 3B, the interlayer insulating film 214 is formed in a pattern shown in FIG. 3C. Next, the upper layer-side conductive film 4b is formed in a pattern shown in FIG. 3D.

As shown in FIGS. 3A and 3D, FIG. 4, and FIGS. 5A to 5C, first, the upper layer-side conductive film 4b is formed as a plurality of rhombic areas in the input area 2a, and the rhombic areas configure pad portions 211a and 212a (large area portions) of the input position detecting electrodes 21 (the first input position detecting electrode 211 and the second input position detecting electrode 212). The pad portions 211a and 212a are alternately arranged in the X direction and the Y direction. Of the plurality of the pad portions 211a, the pad portions 211a that are adjacent to each other in the X direction (the first direction) are connected together through a connection portion 211c, and the pad portion 211a and the connection portion 211c configure the first input position detecting electrode 211 that extends in the X direction.

On the contrary, the plurality of the pad portions 212a configure the second input position detecting electrode 212 that extends in the Y direction (the second direction). However, a portion between the pad portions 212a that are adjacent to each other in the Y direction, that is, a portion overlapping with the connection portion 211c includes a discontinued portion.

The upper layer-side conductive film 4b is formed as a wiring 27 extending from the input position detecting electrode 21 (the first input position detecting electrode 211 and the second input position detecting electrode 212) in the outer area 2b of the input area 2a and is formed as a first mounting terminal 24a and a second mounting terminal 24b near the end portion 20e. When such a wiring 27 is configured, it is preferable that a metal layer formed from chromium, silver, aluminum, a silver-aluminum alloy, or the like is extended along an area for forming the wiring 27 on an upper layer of the upper layer-side conductive film 4b. By employing such a multiple layer structure, the wiring resistance of the wiring 27 can be decreased.

In addition, the upper layer-side conductive film 4b is formed as a shielding auxiliary electrode 29 that passes through an outer periphery side relative to the wiring 27 in the outer area 2b of the input area 2a. The shielding auxiliary electrode 29 extends along the end portions 20f, 20g, and 20h of the substrate 20, and both ends of the shielding auxiliary electrode 29 are connected to the second mounting terminal 24b. Here, the shielding auxiliary electrode 29 overhangs to the outer periphery side relative to the outer periphery of the interlayer insulating film 214 shown in FIG. 3C in any one of the end portions 20f, 20g, and 20h corresponding to three sides of the substrate 20.

As shown in FIGS. 3A and 3C, FIG. 4, and FIGS. 5A to 5C, the interlayer insulating film 214 is formed in the entirety of the input area 2a. In addition, the interlayer insulating film 214 is also formed on the outer area 2b of the input area 2a and is formed in a large area except the outer periphery of the substrate 20. In the interlayer insulating film 214, contact holes 214a are formed in sets of two. The contact holes 214a are formed in positions overlapping with the end portions of the pad portion 212a shown in FIG. 3A that face each other through the discontinued portion 218a. A gap between the outer periphery of the interlayer insulating film 214 and the end portion 20e of the substrate 20 is larger than the gaps between the outer periphery of the interlayer insulating film 214 and other end portions 20f, 20g, and 21h of the substrate 20. Accordingly, a space for forming the first mounting terminal 24a and the second mounting terminal 24b is secured.

As shown in FIGS. 3A and 3B, FIG. 4, and FIGS. 5A to 5C, the lower layer-side conductive film 4a is formed as a relay electrode 215 in an area of the input area 2a that overlaps with the contact hole 214a shown in FIG. 3C. In addition, the lower layer-side conductive film 4a is formed in the input area 2a as an input area shield electrode 25 having a slit 25s interposed between the relay electrode 215 and the input area shield electrode 25. The input area shield electrode 25 is formed over the entirety of the input area 2a except the relay electrode 215 and the slit 25s.

In addition, the lower layer-side conductive film 4a is formed as an outer periphery-side shield electrode 28 in the outer area 2b of the input area 2a. Here, the input area shield electrode 25 and the outer periphery-side shield electrode 28 are formed in a large area of the substrate 20 as one beta area. The outer periphery-side shield electrode 28 is formed near the end portions 20f, 20g, and 20h corresponding to three sides of the substrate 20. Thus, near the end portions 20f, 20g, and 20h, the outer periphery-side shield electrode 28 overhangs to the outer periphery side relative to the outer periphery of the interlayer insulating film 214 shown in FIG. 3C. In addition, the outer periphery-side shield electrode 28 is formed in a large area also near the end portion 20e of the substrate 20 and overhangs to the outer periphery side relative to the outer periphery of the interlayer insulating film 214. However, the outer periphery-side shield electrode 28 is formed to have a concave portion 28a in the area in which the first mounting terminal 24a is formed. The outer periphery-side shield electrode 28 is positioned to the inner side relative to the outer periphery of the interlayer insulating film 214 in an area corresponding to the concave portion 28a and does not overhang to the outer periphery side of the interlayer insulating film 214 in the area.

(Configuration of Input Position Detecting Electrode 21)

By overlapping the lower layer-side conductive film 4a, the interlayer insulating film 214, and the upper layer-side conductive film 4b that are configured as described above, the substrate 20 is configured as shown in FIG. 3A, FIG. 4, and FIGS. 5A, 5B, and 5C. When the substrate 20 is seen in the plan view, on the inner side of the input area 2a, a plurality of the input position detecting electrodes 21 are formed. In this embodiment, the input position detecting electrodes 21 are configured by a plurality of rows of first input position detecting electrodes 211 extending in the X direction and a plurality of rows of second input position detecting electrodes 212 extending in the Y direction.

Here, the input position detecting electrodes 21 (the first input position detecting electrode 211 and the second input position detecting electrode 212) are formed by the upper layer-side conductive film 4b out of the lower layer-side conductive film 4a and the upper layer-side conductive film 4b and are formed from the same layer. Accordingly, on the first face 20a of the substrate 20, there are a plurality of intersection portions 218 of the first input position detecting electrodes 211 and the second input position detecting electrodes 212. In this embodiment, of the first input position detecting electrode 211 and the second input position detecting electrode 212, the first input position detecting electrode 211 is connected by the connection portion 211c formed from the upper layer-side conductive film 4b in the X direction so as to extend also in the intersection portion 218. On the contrary, the discontinued portion 218a is configured in the intersection portion 218 in the second input position detecting electrode 212. However, in the intersection portion 218, the relay electrode 215 is formed on a layer that is lower than that of the interlayer insulating film 214, and the relay electrode 215 electrically connects the pads 212a, which are adjacent to each other through the discontinued portion 218a, through the contract holes 214a of the interlayer insulating film 214. Accordingly, the second input position detecting electrodes 212 are electrically connected in the Y direction. In addition, the relay electrode 215 overlaps with the connection portion 211c through the interlayer insulating film 214, and accordingly, the relay electrode 215 and the connection portion 211c scarcely form a short circuit.

Each of the first input position detecting unit 211 and the second input position detecting electrode 212 that are configured as described above has rectangle-shaped pad portions 211a and 212a having large areas in an area pinched by the intersection portions 218. Accordingly, in the first input position detecting electrode 211, the connection portion 211c positioned in the intersection portion 218 is formed in a narrow shape having a width smaller than the width of the pad portions 211a and 212a. In addition, the relay electrode 215 is formed in a narrow shape having a width smaller than the width of the pad portions 211a and 212a.

(Shielding Structure)

According to the electrostatic capacitance-type input device 1 of this embodiment, the lower layer-side conductive film 4a includes the input area shield electrode 25 that is separated from the relay electrode 215 in the input area 2a. The input area shield electrode 25 overlaps with the first input position detecting electrode 211 and the second input position detecting electrode 212 on the side opposite to the input operation side through the interlayer insulating film 214.

In addition, the lower layer-side conductive film 4a includes the outer periphery-side shield electrode 28 that is integrally formed with the input area shield electrode 25. Such an outer periphery-side shield electrode 28 overlaps with the wiring 27 through the interlayer insulating film 214 on the side opposite to the input operation side, in the outer area 2b of the input area 2a. In addition, the outer periphery-side shield electrode 28 overhangs to the outer periphery side relative to the interlayer insulating film 214 so as to overlap with the shielding auxiliary electrode 29 so as to be electrically connected thereto in the end portions 20f, 20g, and 20h corresponding to three sides of the substrate 20.

In addition, the shielding auxiliary electrode 29 includes the second mounting terminals 24b on both sides of the arrangement area of the first mounting terminal 24a, and the flexible wiring substrate 35 is connected to the first mounting terminal 24a and the second mounting terminal 24b.

(Operation of Detecting Input Position and the Like)

As represented in FIG. 1B, according to the electrostatic capacitance-type input device 1 of this embodiment, the IC 10 is connected to the first mounting terminals 24a and the second mounting terminals 24b of the input panel 2 through the flexible wiring substrate 35. Here, the IC 10 includes a terminal 11a that sequentially outputs a position detecting signal VD to the first mounting terminals 24a through the flexible wiring substrate 35 and a terminal 11b that outputs a shield electric potential VS to the second mounting terminal 24b through the flexible wiring substrate 35. In addition, the IC 10 includes a ground terminal that outputs the ground electric potential to the input panel 2. However, since the ground terminal does not directly relate to an embodiment of the present invention, it is not shown in the figure, and the description thereof is omitted.

According to the electrostatic capacitance-type input device 1 that is configured as described above, the IC 10, for example, outputs the position detecting signal VD having a rectangular pulse shape shown in FIG. 1C. As a result, in a case where capacitance is not parasitic on the input position detecting electrode 21, a signal having a waveform denoted by a solid line in FIG. 1C is detected from the terminal 11a. On the other hand, in a case where capacitance is parasitic on the input position detecting electrode 21, as denoted by a dotted line in FIG. 1C, distortion of the waveform due to the capacitance occurs. Accordingly, it can be detected whether capacitance is parasitic on the input position detecting position electrode 21. Thus, according to this embodiment, the position detecting signal VD is sequentially output to the plurality of the input position detecting electrodes 21, and the electrostatic capacitance coupled with each input position detecting electrode 21 is monitored. Accordingly, when a finger is in proximity to any one of the plurality of the input position detecting electrodes 21, the electrostatic capacitance of the input position detecting electrode 21 to which the finger is in proximity increases by the amount of electrostatic capacitance generated between the finger and the input position detecting electrode 21. Therefore, an electrode to which the finger is in proximity can be specified.

(Operation and Advantages of this Embodiment)

The electrostatic capacitance-type input device 1 described with reference to FIGS. 1A to 5C, detects the change in the capacitance coupled with the input position detecting electrode 21, and accordingly, can be easily influenced by electromagnetic wave noise. Thus, according to this embodiment, a shield layer 35b is formed in the wiring 35a that is formed in the flexible wiring substrate 35, and the shield electric potential VS is applied to the shield layer 35b through the shielding wire 35c. In this embodiment, as the shield electric potential VS, an electric potential having the same waveform (including the phase) as the position detecting signal VD supplied to the input position detecting electrode 21 is applied. Accordingly, a state in which capacitance is not parasitic between the wiring 35a and the shield layer 35b can be realized.

In addition, in this embodiment, the shield electric potential VS having the same waveform (including the phase) as the position detecting signal VD is applied from the IC 10 to the input area shield electrode 25, the outer periphery-side shield electrode 28, and the shielding auxiliary electrode 29 through the flexible wiring substrate 35 and the second mounting terminal 24b.

Here, the input area shield electrode 25 overlaps with the input position detecting electrode 21 on the side opposite to the input operation side. Accordingly, electromagnetic wave noise that may penetrate from the side opposite to the input operation side to the input position detecting electrode 21 can be blocked by the input area shield electrode 25. In addition, the outer periphery-side shield electrode 28 overlaps with the plurality of wirings 27 extending in the outer area 2b of the input area 2a of the substrate 20 on the side opposite to the input operation side. Accordingly, electromagnetic wave noise that may penetrate into the wiring 27 from the side opposite to the input operation side can be blocked by the outer periphery-side shield electrode 28. Accordingly, it is difficult for the input panel 2 to be influenced by electromagnetic waves penetrated from the input operation side. Therefore, in the electrostatic capacitance-type input device 1 of this embodiment, it is difficult for a malfunction due to the influence of the electromagnetic wave noise to occur.

In addition, the shield electric potential VS is an electric potential having the same waveform (including the phase) as the position detecting signal VD supplied to the input position detecting electrode 21. Accordingly, a state in which parasitic capacitance is not generated between the input position detecting electrode 21 and the input area shield electrode 25 and between the wiring 27 and the outer periphery-side shield electrode 28 can be realized. Thus, even when the input area shield electrode 25 and the outer periphery-side shield electrode 28 are disposed, the detection of an input position can be performed by using an electrostatic capacitance method without any problem.

In addition, the input area shield electrode 25 and the outer periphery-side shield electrode 28 are formed by the lower layer-side conductive film 4a that is used for forming the relay electrode 215. In addition, the shielding auxiliary electrode 29 is formed by the upper layer-side conductive film 4b that is used for forming the first input position detecting electrode 211, the second input position detecting electrode 212, and the wiring 27. Thus, there is an advantage in that electromagnetic shielding for the input position detecting electrode 21 and the wiring 27 can be made reliably without adding a separate shielding substrate.

In addition, according to this embodiment, almost the entirety of the outer periphery of the substrate 20 is shielded by the outer periphery-side shield electrode 28 and the shielding auxiliary electrode 29. Accordingly, electromagnetic wave noise that may penetrate into the wiring 27 or the input area 2a from the periphery (the side) can be blocked.

In addition, in the outer area 2b of the substrate 20, the first mounting terminal 24a and the second mounting terminal 24b are disposed by using both the upper layer-side conductive film 4b and the upper layer-side conductive film 4b. Accordingly, an electric potential VS can be applied to the shield electrode from the outside through the flexible wiring substrate 35 connected to the substrate 20. Thus, the shield electric potential VS can be applied to the input area shield electrode 25, the outer periphery-side shield electrode 28, and the shielding auxiliary electrode 29 in an easy manner. In addition, a common flexible wiring substrate 35 may be connected to the first mounting terminal 24a and the second mounting terminal 24b. The second mounting terminal 24b is electrically connected to the outer periphery-side shield electrode 28 on both sides of the arrangement area of the first mounting terminal 24a. Accordingly, electromagnetic wave noise that may penetrate into the wiring 27 or the input area 2a from the periphery (the side) can be blocked.

Embodiment 2

The electrostatic capacitance-type input device 1 that is a type described with reference to FIG. 2A will now be described with reference to FIGS. 6A to 8C.

Figure 6A:
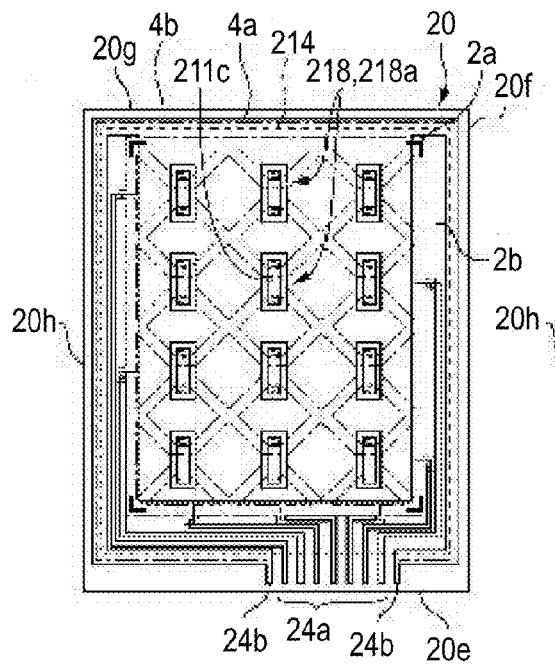
FIGS. 6A to 6D are schematic diagrams illustrating the planar configurations of an electrostatic capacitance-type input device according to Embodiment 2.
Figure 6B:
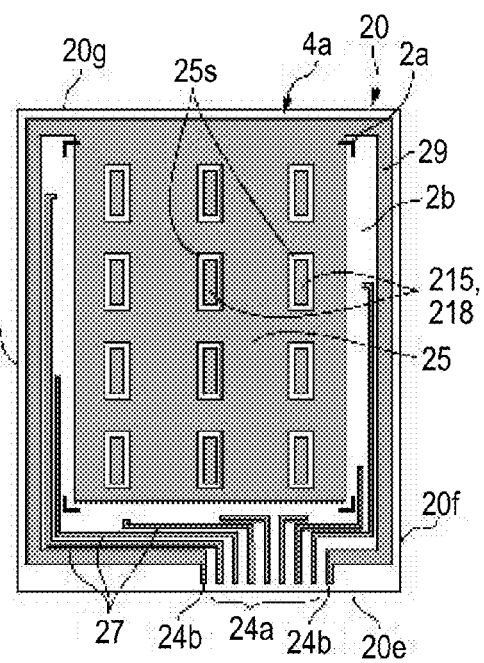
Figure 6C:
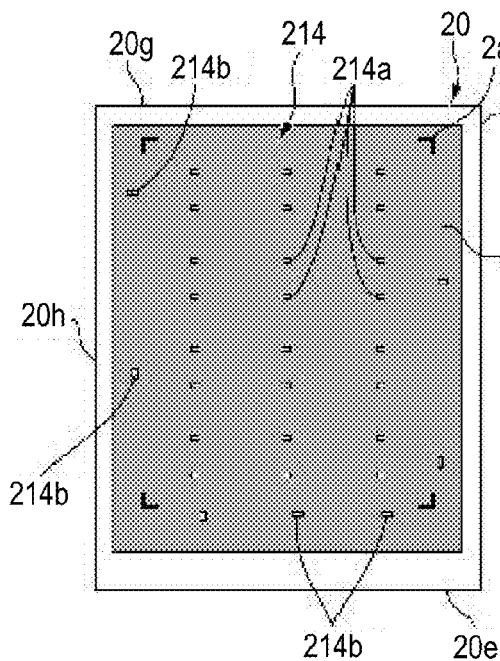
Figure 6D:
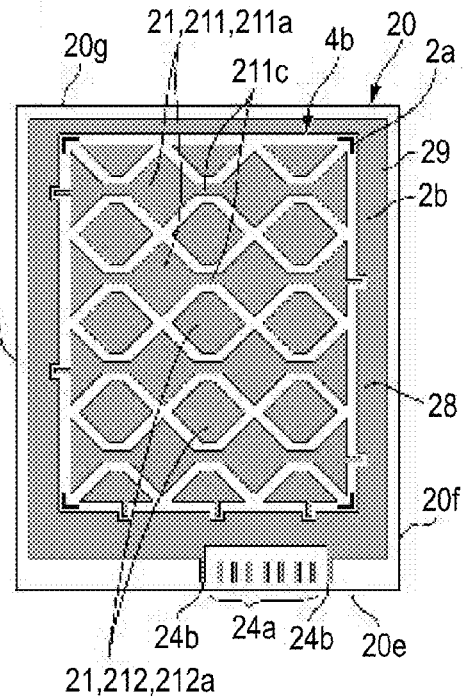
Figure 7:
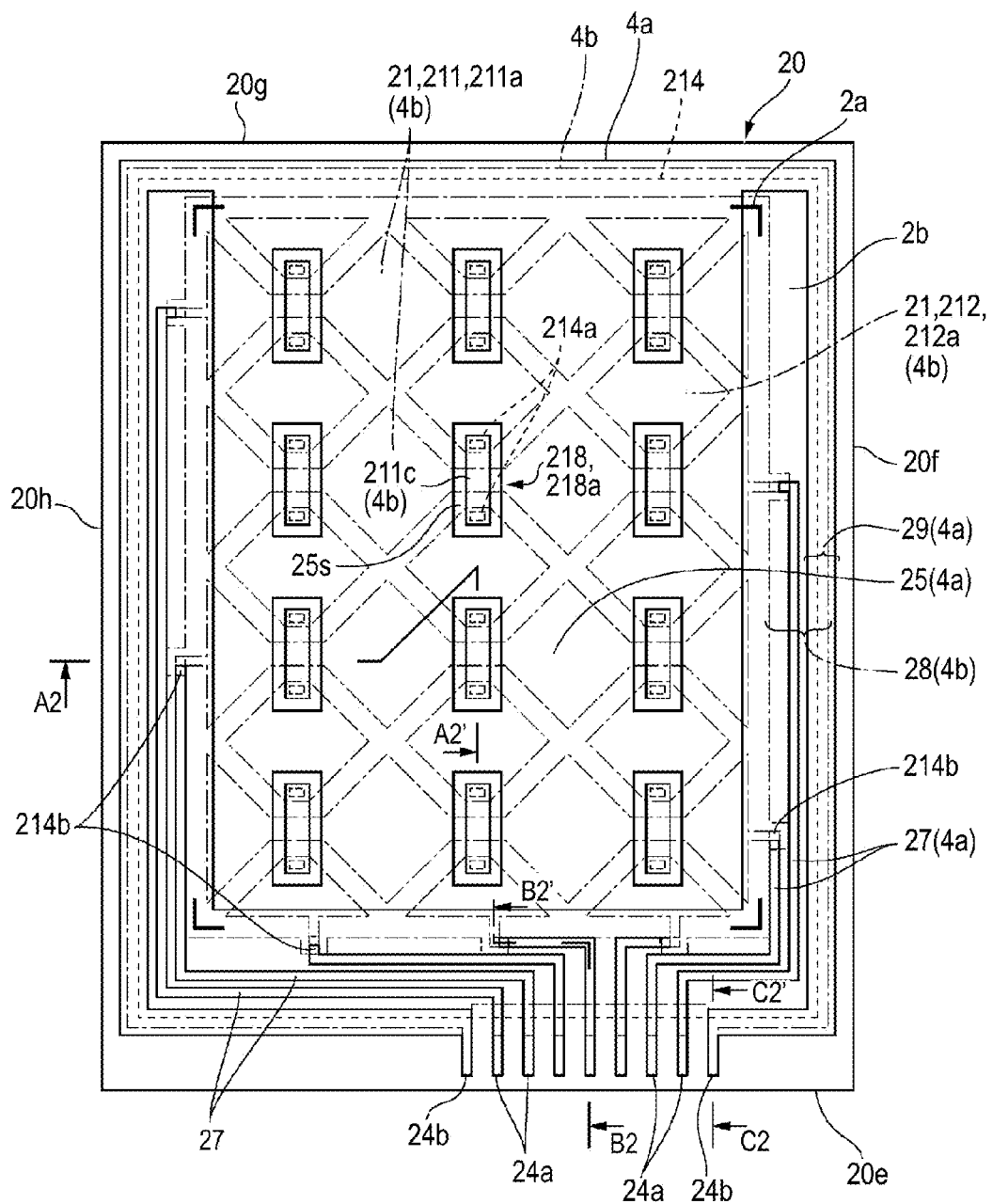
FIG. 7 is an enlarged schematic diagram illustrating the planar configuration of electrodes and the like that are formed on a substrate of an electrostatic capacitance-type input device according to Embodiment 2.
Figure 8A:
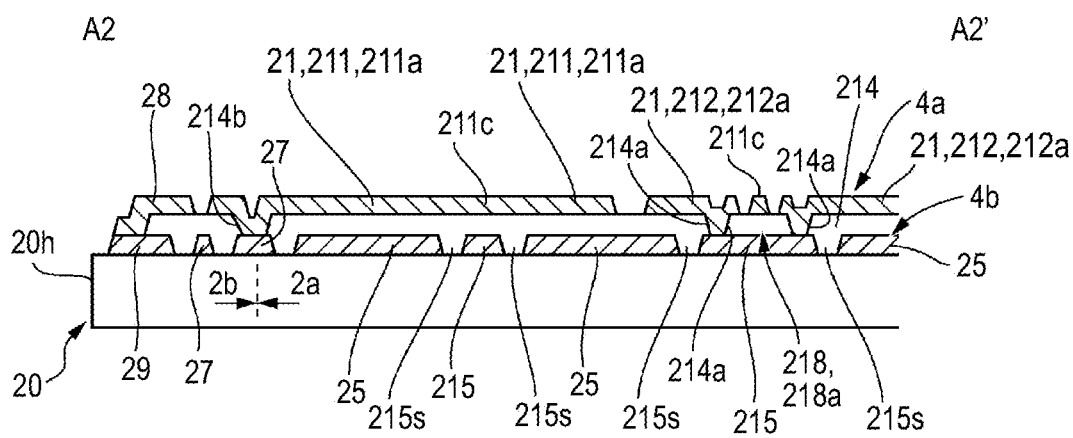
FIGS. 8A, 8B, and 8C are schematic diagrams illustrating the cross-sectional configurations of the substrate of the electrostatic capacitance-type input device according to Embodiment 2.
Figure 8B:
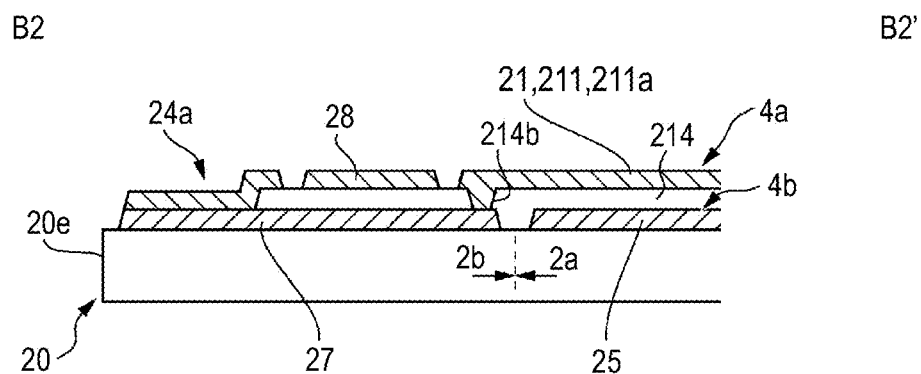
Figure 8C:
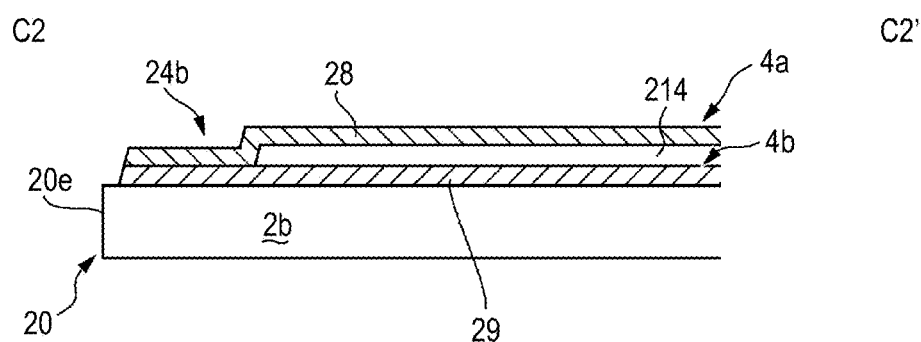

FIGS. 6A to 6D are schematic diagrams illustrating the planar configurations of the electrostatic capacitance-type input device 1 according to Embodiment 2. FIG. 6A is a schematic diagram illustrating the planar positional relationship of electrodes and the like that are formed on the substrate 20 of the electrostatic capacitance-type input device 1. FIG. 6B is a schematic diagram illustrating the planar configuration of the upper layer-side conductive film 4b that is formed on the substrate 20. FIG. 6C is a schematic diagram illustrating the planar configuration of the interlayer insulating film 214 that is formed on the substrate 20. FIG. 6D is a schematic diagram illustrating the planar configuration of the upper layer-side conductive film 4b that is formed on the substrate 20. In FIG. 6A, elements that are shown in FIGS. 6B, 6C, and 6D are represented in an overlapping manner. FIG. 7 is an enlarged schematic diagram illustrating the planar configuration of electrodes and the like that are formed on the substrate 20 of the electrostatic capacitance-type input device 1 according to Embodiment 2. FIGS. 8A, 8B, and 8C are schematic diagrams illustrating the cross-sectional configurations of the substrate 20 of the electrostatic capacitance-type input device 1 according to Embodiment 2. FIGS. 8A, 8B, and 8C are cross-sectional views of the substrate 20 taken along lines A2-A2', B2-B2', and C2-C2' shown in FIGS. 6A to 6D.

The electrostatic capacitance-type input device 1 described below, similarly to Embodiment 1, is an example of the form (the form represented in FIG. 2A), in which the lower layer-side conductive film 4a, the interlayer insulating film 214, and the upper layer-side conductive film 4b are formed on the first face 20a that is positioned on the input operation side, according to an embodiment. Here, the upper layer-side conductive film 4b corresponds to the first conductive film that is positioned on the input operation side, and the lower layer-side conductive film 4a corresponds to the second conductive film that is positioned on the side opposite to the input operation side.

However, in this embodiment, as described below, the shielding auxiliary electrode 29 and the wiring 27 are formed in the lower layer-side conductive film 4a, and the outer periphery-side shield electrode 28 is formed in the upper layer-side conductive film 4b. Other configurations are approximately the same as those of Embodiment 1. Thus, a same reference sign is assigned to each common portion, and detailed description thereof is omitted.

(Configuration of Electrodes)

As shown in FIGS. 6A to 6D, FIG. 7, and FIGS. 8A to 8C, according to the electrostatic capacitance-type input device 1 of this embodiment, on the first face 20a side of the substrate 20, the lower layer-side conductive film 4a, the interlayer insulating film 214, and the upper layer-side conductive film 4b are sequentially formed from the lower layer side toward the upper layer side viewed from the substrate 20. In this embodiment, each of the lower layer-side conductive film 4a and the upper layer-side conductive film 4b is formed of a translucent conductive film having a film thickness of 10 nm to 40 nm such as an ITO film or an IZO (Indium Zinc Oxide) film, and the interlayer insulating film 214 is formed of a translucent insulating film having a film thickness of 40 nm to 60 mm such as a silicon oxide film. In order to configure such an electrostatic capacitance-type input device 1, first, after the lower layer-side conductive film 4a is formed in a pattern shown in FIG. 6B, the interlayer insulating film 214 is formed in a pattern shown in FIG. 6C. Next, the upper layer-side conductive film 4b is formed in a pattern shown in FIG. 6D.

As shown in FIGS. 6A and 6D, FIG. 7, and FIGS. 8A to 8C, also in this embodiment, similarly to Embodiment 1, the upper layer-side conductive film 4b is formed as a plurality of rhombic areas in the input area 2a, and the rhombic areas configure pad portions 211a and 212a (large area portions) of the input position detecting electrodes 21 (the first input position detecting electrode 211 and the second input position detecting electrode 212). Of the plurality of the pad portions 211a, the pad portions 211a that are adjacent to each other in the X direction (the first direction) are connected together through the connection portion 211c, and the pad portion 211a and the connection portion 211c configure the first input position detecting electrode 211 that extends in the X direction. On the contrary, the plurality of the pad portions 212a configure the second input position detecting electrode 212 that extends in the Y direction (the second direction). However, a portion between the pad portions 212a that are adjacent to each other in the Y direction, that is, a portion overlapping with the connection portion 211c includes a discontinued portion.

In addition, the upper layer-side conductive film 4b is formed as the outer periphery-side shield electrode 28 in the outer area 2b of the input area 2a. Here, the outer periphery-side shield electrode 28 is formed up to an area near the end portions 20f, 20g, and 20h corresponding to three sides of the substrate 20. The outer periphery-side shield electrode 28 overhangs to the outer periphery side relative to the outer periphery of the interlayer insulating film 214 shown in FIG. 6C near the end portions 20f, 20g, and 20h. In addition, the outer periphery-side shield electrode 28 is formed over a wide range also near the end portion 20e of the substrate 20 and overhangs to the outer periphery side relative to the outer periphery of the interlayer insulating film 214. However, the outer periphery-side shield electrode 28 is formed to have a concave portion 28a in the area in which the first mounting terminal 24a is formed. The outer periphery-side shield electrode 28 is positioned to the inner side relative to the outer periphery of the interlayer insulating film 214 in an area corresponding to the concave portion 28a and does not overhang to the outer periphery side of the interlayer insulating film 214 in the area.

In addition, the upper layer-side conductive film 4b is also formed in positions overlapping with the first mounting terminal 24a and the second mounting terminal 24b.

As shown in FIGS. 6A and 6C, FIG. 7, and FIGS. 8A to 8C, the interlayer insulating film 214 is formed in the entirety of the input area 2a. In addition, the interlayer insulating film 214 is also formed in the outer area 2b of the input area 2a and is formed in a wide area except the outer periphery of the substrate 20. In the interlayer insulating film 214, contact holes 214a are formed in sets of two. The contact holes 214a are formed in positions overlapping with the end portions of the pad portion 212a shown in FIG. 6A that face each other through the discontinued portion 218a. A gap between the outer periphery of the interlayer insulating film 214 and the end portion 20e of the substrate 20 is larger than the gaps between the outer periphery of the interlayer insulating film 214 and other end portions 20f, 20g, and 21h of the substrate 20. Accordingly, a space for forming the first mounting terminal 24a and the second mounting terminal 24b is secured.

In addition, in the interlayer insulating film 214, contact holes 214b are formed in positions overlapping with the end portions of the input position detecting electrodes 21 (the first input position detecting electrode 211 and the second input position detecting electrode 212) shown in FIG. 6D. The position of the contact hole 214b is also a position overlapping with the end portion of the wiring 27 shown in FIG. 6B.

As shown in FIGS. 6A and 6B, FIG. 7, and FIGS. 8A to 8C, the lower layer-side conductive film 4a is formed as the relay electrode 215 in an area of the input area 2a that overlaps with the contact hole 214a shown in FIG. 6C. In addition, the lower layer-side conductive film 4a is formed in the input area 2a as the input area shield electrode 25 having the slit 25s interposed between the relay electrode 215 and the input area shield electrode 25. The input area shield electrode 25 is formed over the entirety of the input area 2a except the relay electrode 215 and the slit 25s.

In addition, in the outer area 2b of the input area 2a, the lower layer-side conductive film 4a is formed as the wiring 27 that extends from the position overlapping the end portions of the input position detecting electrode 21 (the first input position detecting electrode 211 and the second input position detecting electrode 212) to the first mounting terminal 24a and is formed as the first mounting terminal 24a and the second mounting terminal 24b near the end portion 20e.

In addition, the lower layer-side conductive film 4a is formed as the shielding auxiliary electrode 29 that passes an outer periphery side relative to the wiring 27 in the outer area 2b of the input area 2a. The shielding auxiliary electrode 29 extends along the end portions 20f, 20g, and 20h of the substrate 20, and both ends of the shielding auxiliary electrode 29 are connected to the second mounting terminal 24b. Here, the shielding auxiliary electrode 29 overhangs to the outer periphery side relative to the outer periphery of the interlayer insulating film 214 shown in FIG. 6C in any one of the end portions 20f, 20g, and 20h corresponding to three sides of the substrate 20.

By overlapping the lower layer-side conductive film 4a, the interlayer insulating film 214, and the upper layer-side conductive film 4b that are configured as described above, the relay electrode 215 electrically connects the pads 212a, which are adjacent to each other through the discontinued portion 218a, through the contact holes 214a of the interlayer insulating film 214. In addition, the end portion of the wiring 27 is electrically connected to the end portion of the input position detecting electrode 21 (the first input position detecting electrode 211 and the second input position detecting electrode 212) through the contact hole 214b.

(Shielding Structure)

According to the electrostatic capacitance-type input device 1 of this embodiment, similarly to Embodiment 1, the lower layer-side conductive film 4a includes the input area shield electrode 25 that is separated from the relay electrode 215 in the input area 2a. The input area shield electrode 25 overlaps with the first input position detecting electrode 211 and the second input position detecting electrode 212 on the side opposite to the input operation side through the interlayer insulating film 214.

In addition, the upper layer-side conductive film 4b includes the outer periphery-side shield electrode 28. In the outer area 2b of the input area 2a, the outer periphery-side shield electrode 28 overlaps with the wiring 27 on the input operation side through the interlayer insulating film 214. In addition, the outer periphery-side shield electrode 28 overhangs to the outer periphery side relative to the interlayer insulating film 214 so as to overlap with the shielding auxiliary electrode 29 and be electrically connected thereto in the end portions 20f, 20g, and 20h corresponding to three sides of the substrate 20.

(Major Advantages of this Embodiment)

According to this embodiment, similarly to Embodiment 1, a shield electric potential VS having the same waveform (including the phase) as the position detecting signal VD is applied from the IC 10 shown in FIGS. 1A to 1C to the input area shield electrode 25, the outer periphery-side shield electrode 28, and the shielding auxiliary electrode 29 through the flexible wiring substrate 35 and the second mounting terminal 24b.

Here, the input area shield electrode 25 overlaps with the input position detecting electrode 21 on the side opposite to the input operation side. Accordingly, electromagnetic wave noise that may penetrate from the side opposite to the input operation side to the input position detecting electrode 21 can be blocked by the input area shield electrode 25.

In addition, the outer periphery-side shield electrode 28 overlaps with the plurality of wirings 27 extending in the outer area 2b of the input area 2a of the substrate 20 on the input operation side. Accordingly, electromagnetic wave noise that may penetrate into the wiring 27 from the input operation side can be blocked by the outer periphery-side shield electrode 28.

In addition, the shield electric potential VS is an electric potential having the same waveform (including the phase) as the position detecting signal VD supplied to the input position detecting electrode 21. Accordingly, the same advantages as those of Embodiment 1 such as the absence of generation of parasitic capacitance between the input position detecting electrode 21 and the input area shield electrode 25 and between the wiring 27 and the outer periphery-side shield electrode 28 are acquired.

Embodiment 3

The electrostatic capacitance-type input device 1 that is a type described with reference to FIG. 2B will now be described with reference to FIGS. 9A to 9C. The electrostatic capacitance-type input device 1 described below, in contrast to Embodiments 1 and 2, is an example of the form (the form represented in FIG. 2B), in which the lower layer-side conductive film 4a, the interlayer insulating film 214, and the upper layer-side conductive film 4b are formed on the second face 20b that is positioned on the side opposite to the input operation side, to which the configuration of Embodiment 1 is applied. In the electrostatic capacitance-type input device 1 having the above-described configuration, the lower layer-side conductive film 4a corresponds to the first conductive film that is positioned on the input operation side, and the upper layer-side conductive film 4b corresponds to the second conductive film that is positioned on the side opposite to the input operation side. Even in a case where such a configuration is employed, the basic configuration is the same as that of Embodiment 1. Thus, an identical reference sign is assigned to each common portion, and detailed description thereof is omitted.

Figure 9A:
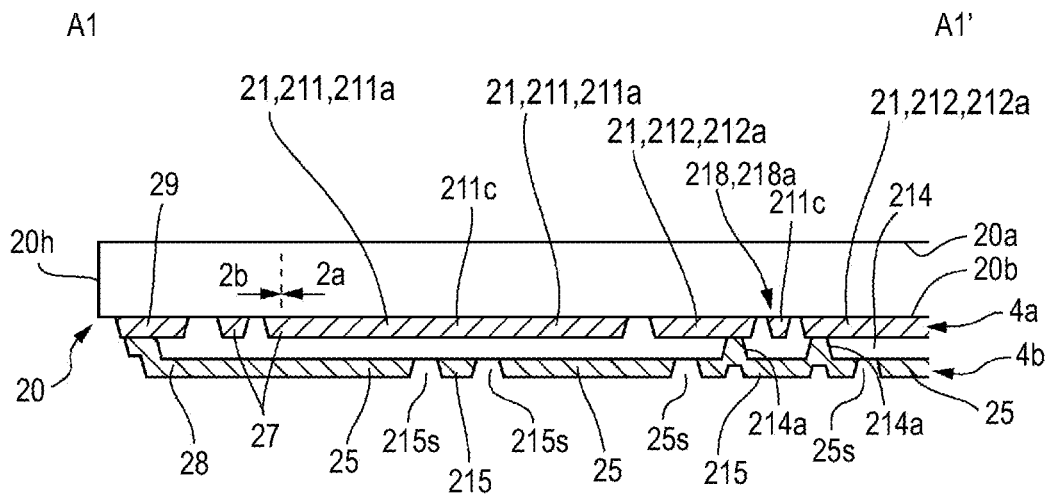
FIGS. 9A, 9B, and 9C are schematic diagrams illustrating the cross-sectional configurations of a substrate of an electrostatic capacitance-type input device according to Embodiment 3.
Figure 9B:
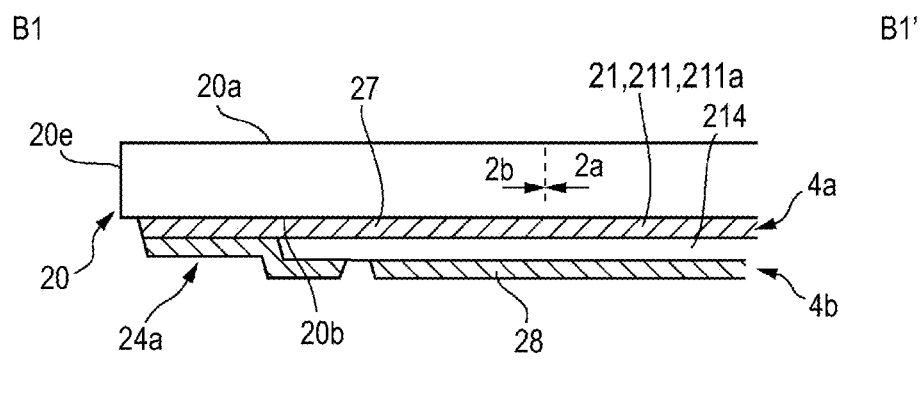
Figure 9C:
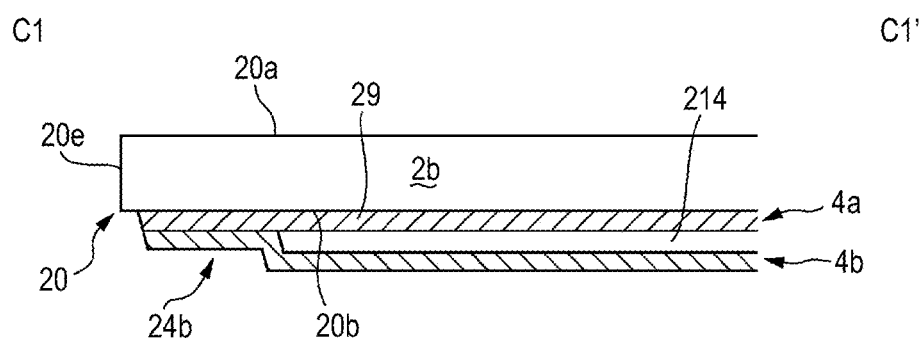

FIGS. 9A, 9B, and 9C are schematic diagrams illustrating the cross-sectional configurations of the substrate 20 of the electrostatic capacitance-type input device 1 according to Embodiment 3. FIGS. 9A, 9B, and 9C are cross-sectional views of the substrate 20 taken along lines A1-A1', B1-B1', and C1-C1' shown in FIG. 4.

According to this embodiment, first, the lower layer-side conductive film 4a is formed in the pattern described with reference to FIGS. 3A and 3D. Next, the interlayer insulating film 214 is formed in the pattern described with reference to FIGS. 3A and 3C. Next, the upper layer-side conductive film 4b is formed in the pattern described with reference to FIGS. 3A and 3B. Accordingly, as shown in FIGS. 9A to 9C, the input position detecting electrodes 21 (the first input position detecting electrode 211 and the second input position detecting electrode 212), the wiring 27, and the shielding auxiliary electrode 29 are formed by the lower layer-side conductive film 4a. In addition, in an upper layer of the lower layer-side conductive film 4a, the interlayer insulating film 214 including the contact holes 214a is formed. In addition, the relay electrode 215, the input area shield electrode 25, and the outer periphery-side shield electrode 28 are formed by the upper layer-side conductive film 4b.

As a result, the relay electrode 215 electrically connects the pads 212a, which are adjacent to each other through the discontinued portion 218a, through the contact holes 214a of the interlayer insulating film 214. In addition, the input area shield electrode 25 overlaps with the first input position detecting electrode 211 and the second input position detecting electrode 212 through the interlayer insulating film 214 on the side opposite to the input operation side. In addition, the outer periphery-side shield electrode 28 overlaps with the wiring 27 through the interlayer insulating film 214 on the side opposite to the input operation side in the outer area 2b of the input area 2a. Thus, according to this embodiment, similarly to Embodiment 1, electromagnetic wave noise that may penetrate from the side opposite to the input operation side to the input position detecting electrode 21 can be blocked by the input area shield electrode 25. In addition, electromagnetic wave noise that may penetrate into the wiring 27 from the side opposite to the input operation side can be blocked by the outer periphery-side shield electrode 28. Accordingly, it is difficult for the input panel 2 to be influenced by the penetration of electromagnetic waves from the input operation side. Therefore, according to the electrostatic capacitance-type input device 1, the same advantages as those of Embodiment 1, such as reduced likelihood of occurrence of malfunction due to the influence of electromagnetic wave noise, are acquired.

Embodiment 4

The electrostatic capacitance-type input device 1 that is a type described with reference to FIG. 2B will now be described with reference to FIGS. 10A to 10C. The electrostatic capacitance-type input device 1 described below is an example of the form (the form represented in FIG. 2B), in which the lower layer-side conductive film 4a, the interlayer insulating film 214, and the upper layer-side conductive film 4b are formed on the second face 20b that is positioned on the side opposite to the input operation side, to which the configuration of Embodiment 2 is applied. In the electrostatic capacitance-type input device 1 having the above-described configuration, the lower layer-side conductive film 4a corresponds to the first conductive film that is positioned on the input operation side, and the upper layer-side conductive film 4b corresponds to the second conductive film that is positioned on the side opposite to the input operation side. Even in a case where such a configuration is employed, the basic configuration is the same as that of Embodiment 2. Thus, a same reference sign is assigned to each common portion, and detailed description thereof is omitted.

Figure 10A:
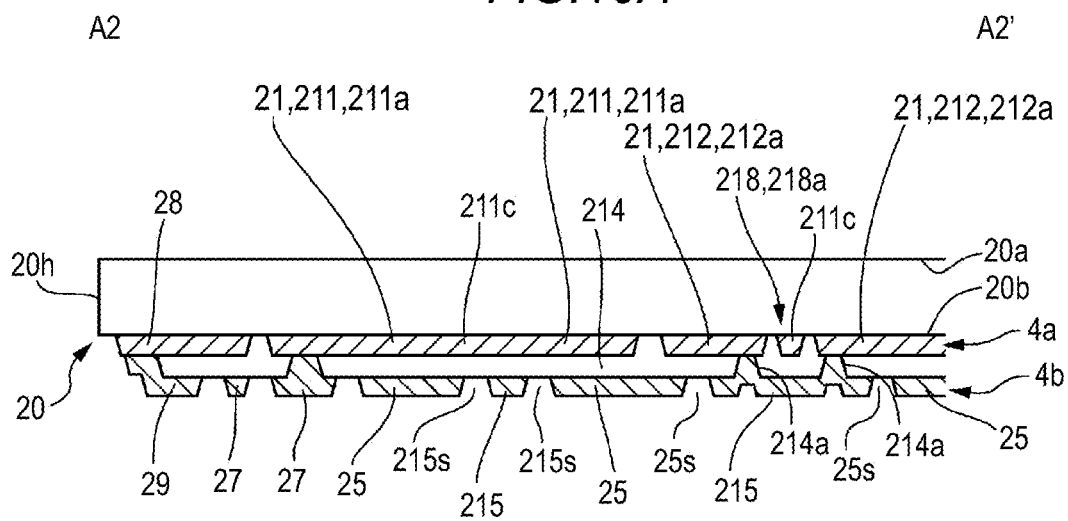
FIGS. 10A, 10B, and 10C are schematic diagrams illustrating the cross-sectional configurations of a substrate of an electrostatic capacitance-type input device according to Embodiment 4.
Figure 10B:
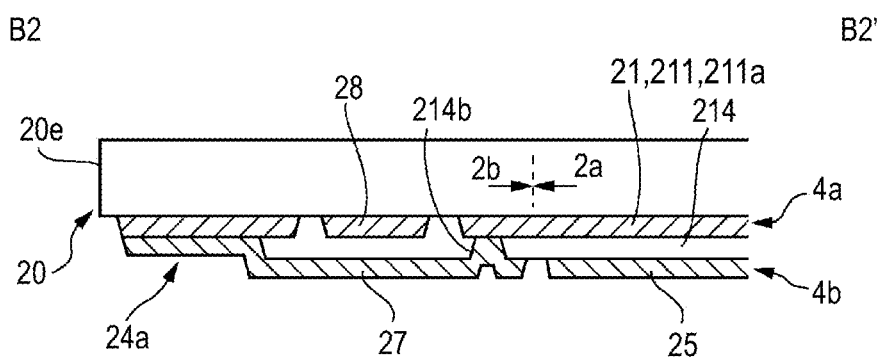
Figure 10C:
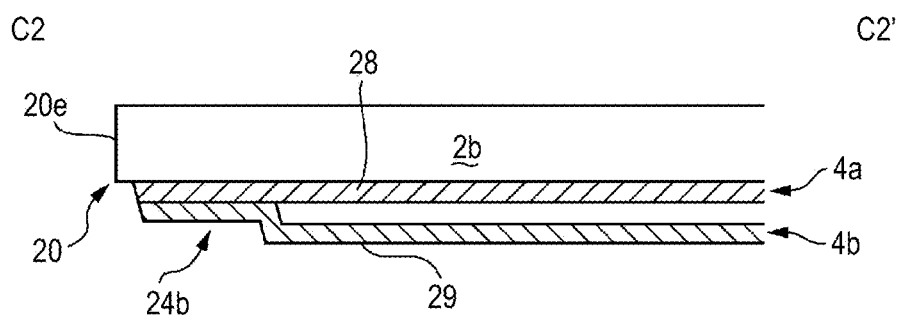

FIGS. 10A, 10B, and 10C are schematic diagrams illustrating the cross-sectional configurations of the substrate 20 of the electrostatic capacitance-type input device 1 according to Embodiment 4. FIGS. 10A, 10B, and 10C are cross-sectional views of the substrate 20 taken along lines A2-A2', B2-B2', and C2-C2' shown in FIG. 7.

According to this embodiment, first, the lower layer-side conductive film 4a is formed in the pattern described with reference to FIGS. 6A and 6D. Next, the interlayer insulating film 214 is formed in the pattern described with reference to FIGS. 6A and 6C. Next, the upper layer-side conductive film 4b is formed in the pattern described with reference to FIGS. 6A and 6B. Accordingly, as shown in FIGS. 10A to 10C, the input position detecting electrodes 21 (the first input position detecting electrode 211 and the second input position detecting electrode 212) and the outer periphery-side shield electrode 28 are formed by the lower layer-side conductive film 4a. In addition, in an upper layer of the lower layer-side conductive film 4a, the interlayer insulating film 214 including the contact holes 214a and 214b is formed. In addition, the relay electrode 215, the input area shield electrode 25, the wiring 27, and the shielding auxiliary electrode 29 are formed by the upper layer-side conductive film 4b.

As a result, the relay electrode 215 electrically connects the pads 212a, which are adjacent to each other through the discontinued portion 218a, through the contact holes 214a of the interlayer insulating film 214. In addition, the input area shield electrode 25 overlaps with the first input position detecting electrode 211 and the second input position detecting electrode 212 through the interlayer insulating film 214 on the side opposite to the input operation side. Thus, according to this embodiment, similarly to Embodiments 1 to 3, electromagnetic wave noise that may penetrate from the side opposite to the input operation side to the input position detecting electrode 21 can be blocked by the input area shield electrode 25. In addition, the outer periphery-side shield electrode 28 overlaps with the wiring 27 through the interlayer insulating film 214 on the input operation side in the outer area 2b of the input area 2a. Accordingly, similarly to Embodiment 2, electromagnetic wave noise that may penetrate into the wiring 27 from the input operation side can be blocked by the outer periphery-side shield electrode 28.

Other Embodiments

In the above-described embodiments, the lower layer-side conductive film 4a or the upper layer-side conductive film 4b is used in forming the outer periphery-side shield electrode 28 for the wiring 27 on the input operation side. However, for example, it may be configured that the light shielding layer 90a formed in the cover 90 shown in FIGS. 2A and 2B is formed by a conductive film formed from chromium or the like, and the light shielding layer 90a is used as the shield electrode.

In the above-described embodiments, the liquid crystal device is used as the image generating device 5. However, an organic electroluminescent device may be used as the image generating device 5.

[Example of Mounting in Electronic Apparatus]

Figure 11A:
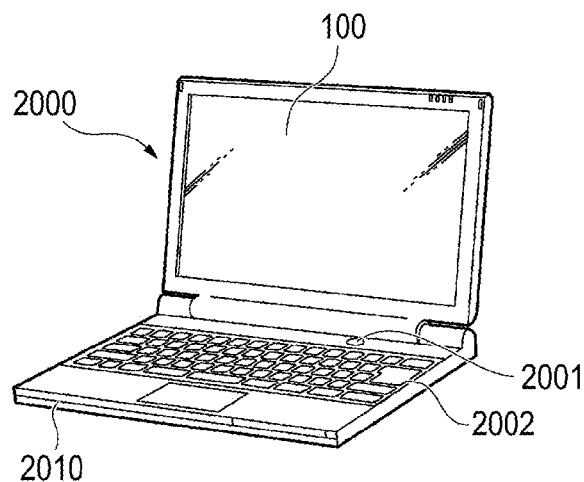
FIGS. 11A, 11B, and 11C are schematic diagrams of electronic apparatuses including an electrostatic capacitance-type input device according to an embodiment.
Figure 11B:
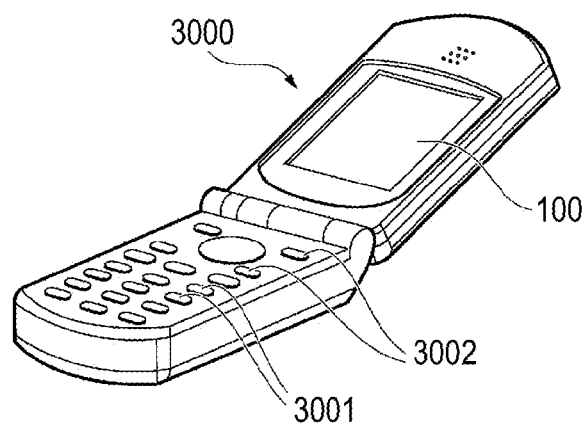
Figure 11C:
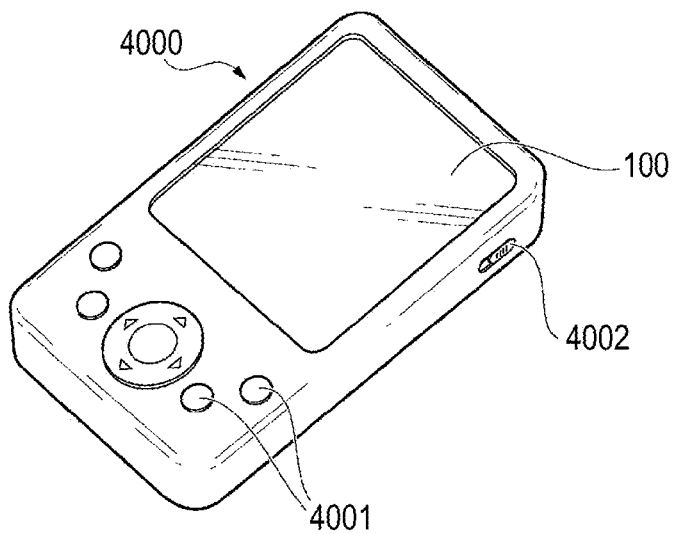

Next, an electronic apparatus to which the input device-attached electro-optical apparatus 100 according to the above-described embodiment is applied will be described. FIG. 11A represents the configuration of a mobile-type personal computer including the input device-attached electro-optical apparatus 100. The personal computer 2000 includes the input device-attached electro-optical apparatus 100 as a display unit and a main body unit 2010. In the main body unit 2010, a power switch 2001 and a keyboard 2002 are disposed. FIG. 11B represents the configuration of a cellular phone including the input device-attached electro-optical apparatus 100. The cellular phone 3000 includes a plurality of operation buttons 3001, scroll buttons 3002, and the input device-attached electro-optical apparatus 100 as a display unit. By operating the scroll buttons 3002, the screen displayed in the input device-attached electro-optical apparatus 100 is scrolled. FIG. 11C represents the configuration of a personal digital assistant (PDA) to which the input device-attached electro-optical apparatus 100 is applied. The personal digital assistant 4000 includes a plurality of operation buttons 4001, a power switch 4002, and the input device-attached electro-optical apparatus 100 as a display unit. When the power switch 4002 is operated, various types of information such as an address list or a schedule book is displayed in the input device-attached electro-optical apparatus 100.

In addition, as examples of electronic apparatuses, to which the input device-attached electro-optical apparatus 100 is applied, other than the electronic apparatuses shown in FIGS. 11A to 11C, there are electronic apparatuses such as a digital still camera, a liquid crystal television set, a view finder-type or monitor direct-viewing-type video cassette recorder, a car navigation system, a pager, an electronic organizer, a calculator, a word processor, a workstation, a television phone, a POS terminal, and a banking terminal. As a display unit of the above-described various electronic apparatuses, the above-described input device-attached electro-optical apparatus 100 can be applied.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electrostatic capacitance-type input device in which a plurality of input position detecting electrodes are disposed in an input area of a substrate, the electrostatic capacitance-type input device comprising:
    a lower layer-side conductive film;
    an interlayer insulating film;
    an upper layer-side conductive film, which are stacked on the substrate in this order from the substrate side,
    a first input position detecting electrode that extends in a first direction of an in-plane direction of the substrate;
    a second input position detecting electrode that extends in a second direction intersecting the first direction of the in-plane direction of the substrate and includes a discontinued portion in an intersection portion of the first input position detecting electrode, the second input position detecting electrode being formed as the input position detecting electrodes by a first conductive film, which is positioned in an input operation side, out of the lower layer-side conductive film and the upper layer-side conductive film;
    a relay electrode that overlaps with the first input position detecting electrode through the interlayer insulating film in the intersection portion so as to be electrically connected to the discontinued portion of the second input position detecting electrode; and
    an input area shield electrode that is separated from the relay electrode and overlaps with the first input position detecting electrode and the second input position detecting electrode through the interlayer insulating film in a plan view are formed by a second conductive film, which is positioned on a side opposite to the input operation side, out of the lower layer-side conductive film and the upper layer-side conductive film,
    wherein the input area shield electrode is applied with a shield electric potential having the same waveform and phase as a position detection signal applied to the first input position detecting electrode and the second input position detecting electrode,
    wherein the first input position detecting electrode and the second input position detecting electrode are coupled with a controller, which detects an input operation performed on the electrostatic capacitance-type input device, via a wiring through which the position detecting signal is transmitted, and
    wherein a flexible wiring substrate includes a flexible substrate wiring of the wiring and a shield layer which is applied with the electric potential,
    wherein, in an area of the substrate that is positioned on an outer side of the input area,
    the wiring that is electrically connected to the input position detecting electrode by one conductive film of the first conductive film and the second conductive film is formed, and
    an outer periphery-side shield electrode that overlaps with the wiring through the interlayer insulating film in a plane view is formed by the other conductive film of the first conductive film and the second conductive film,
    wherein, on an outer periphery side of the wiring on the substrate, a shielding auxiliary electrode is formed by the conductive film, which is disposed on the side forming the wiring, out of the first conductive film and the second conductive film,
    wherein the shielding auxiliary electrode and the outer periphery-side shield electrode overlap with each other so as to be electrically connected to each other in an area in which the interlayer insulating film disposed on the outer periphery side of the wiring is not formed, and
    wherein the shielding auxiliary electrode is electrically connected to the input area shield electrode.

2. The electrostatic capacitance-type input device according to claim 1, wherein the wiring is formed by the first conductive film, and
    wherein the outer periphery-side shield electrode is formed by the second conductive film.

3. The electrostatic capacitance-type input device according to claim 2, wherein the outer periphery-side shield electrode is formed integrally with the input area shield electrode by the second conductive film.

4. The electrostatic capacitance-type input device according to claim 1, wherein the wiring is formed by the second conductive film, and wherein the outer periphery-side shield electrode is formed by the first conductive film.

5. The electrostatic capacitance-type input device according to claim 1, wherein, the lower layer-side conductive film, the interlayer insulating film, and the upper-layer side conductive film are formed on a substrate face that is positioned on the input operation side of the substrate, and wherein the upper layer-side conductive film is the first conductive film, and the lower layer-side conductive film is the second conductive film.

6. The electrostatic capacitance-type input device according to claim 1, wherein the lower layer-side conductive film, the interlayer insulating film, and the upper-layer side conductive film are formed on a substrate face that is positioned on a side opposite to the input operation side of the substrate, and wherein the lower layer-side conductive film is the first conductive film, and the upper layer-side conductive film is the second conductive film.

7. The electrostatic capacitance-type input device according to claim 1, wherein the shielding auxiliary electrode is integrally formed with the input area shield electrode.

8. An input device-attached electro-optical apparatus including an electrostatic capacitance-type input device in which a plurality of input position detecting electrodes are disposed in an input area of a substrate, the electrostatic capacitance-type input device comprising:

a lower layer-side conductive film;

an interlayer insulating film;

an upper layer-side conductive film, which are stacked on the substrate in this order from the substrate side;

a first input position detecting electrode that extends in a first direction of an in-plane direction of the substrate;

a second input position detecting electrode that extends in a second direction intersecting the first direction of the in-plane direction of the substrate and includes a discontinued portion in an intersection portion of the first input position detecting electrode and the second input position detecting electrode are formed as the input position detecting electrodes by a first conductive film, which is positioned in an input operation side, out of the lower layer-side conductive film and the upper layer-side conductive film;

a relay electrode that overlaps with the first input position detecting electrode through the interlayer insulating film in the intersection portion so as to be electrically connected to the discontinued portion of the second input position detecting electrode;

an input area shield electrode that is separated from the relay electrode and overlaps with the first input position detecting electrode and the second input position detecting electrode through the interlayer insulating film in a plan view are formed by a second conductive film, which is positioned on a side opposite to the input operation side, out of the lower layer-side conductive film and the upper layer-side conductive film; and an electro-optical panel for generating an image being configured on a side of the substrate that is opposite to the input operation side, wherein the input area shield electrode is applied with a shield electric potential having the same waveform and phase as a position detection signal applied to the first input position detecting electrode and the second input position detecting electrode, wherein the first input position detecting electrode and the second input position detecting electrode are coupled with a controller, which detects an input operation performed on the electrostatic capacitance-type input device, via a wiring through which the position detecting signal is transmitted, and wherein a flexible wiring substrate includes a flexible substrate wiring of the wiring and a shield layer which is applied with the shield electric potential, wherein, in an area of the substrate that is positioned on an outer side of the input area, the wiring that is electrically connected to the input position detecting electrode by one conductive film of the first conductive film and the second conductive film is formed, and an outer periphery-side shield electrode that overlaps with the wiring through the interlayer insulating film in a plane view is formed by the other conductive film of the first conductive film and the second conductive film, wherein, on an outer periphery side of the wiring on the substrate, a shielding auxiliary electrode is formed by the conductive film, which is disposed on the side forming the wiring, out of the first conductive film and the second conductive film, wherein the shielding auxiliary electrode and the outer periphery-side shield electrode overlap with each other so as to be electrically connected to each other in an area in which the interlayer insulating film disposed on the outer periphery side of the wiring is not formed, and wherein the shielding auxiliary electrode is electrically connected to the input area shield electrode.

* * * * *